United States Patent [19]
Hasegawa

[11] Patent Number: 6,073,024
[45] Date of Patent: *Jun. 6, 2000

[54] MOBILE COMMUNICATION SYSTEM AND METHOD FOR PERFORMING COMMUNICATION CONTROL WITHIN A BASE STATION AND A MOBILE STATION

[75] Inventor: Hajime Hasegawa, Kawasaki, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/496,423

[22] Filed: Jun. 29, 1995

[30] Foreign Application Priority Data

Oct. 28, 1994 [JP] Japan ..................................... 6-265554

[51] Int. Cl.$^7$ ...................................................... H04B 7/00
[52] U.S. Cl. ............................................. 455/522; 455/69
[58] Field of Search .................................. 455/38.3, 53.1, 455/54.1, 54.2, 69, 70, 517, 509, 522, 515, 575

[56] References Cited

U.S. PATENT DOCUMENTS 5,247,702  9/1993  Su et al. ............................. 455/54.2 X
5,564,075  10/1996 Gourgue ..................................... 455/69
5,603,096  2/1997  Gilhousen et al. ..................... 455/522

Primary Examiner—Thanh Cong Le
Attorney, Agent, or Firm—Helfgott & Karas, P.C.

[57] ABSTRACT

A mobile communication system includes a base station and a mobile station, the base station including reporting unit that reports information to the mobile station, considering the transmission output difference to the mobile station; the mobile station including receiving unit that receives the broadcast information reported from the reporting unit of the base station and control unit that controls with a communication control information of each of the mobile stations according to the broadcast information received by the receiving unit and implements a communication control when a desired receiving level is bidirectionally obtained between the base station and the mobile station. The object is to always ensure a predetermined quality in up and down directional communications.

18 Claims, 23 Drawing Sheets

FIG. 9

| | |
|---|---|
| (a) | MESSAGE SORT |
| (b) | NETWORK NUMBER |
| (c) | REGULATORY INFORMATION |
| (d) | CONTROL CHANNEL STRUCTURE INFORMATION |
| (e) | MOBILE STATION TRANSMISSION POWER DESIGNATION |
| (f) | COMMUNICATION LEVEL BY TRANSMISSION OUTPUT OF MOBILE STATION |
| (g) | COMMUNICATION OUT LEVEL BY TRANSMISSION OUTPUT OF MOBILE STATION |
| (h) | POSITION REGISTRATION AREA MULTIPLEX NUMBER |
| (i) | POSITION NUMBER |
| (j) | NUMBER OF MAXIMUM REPORT CHANNELS |
| (k) | PERCH CHANNEL NUMBER FOR COMMUNICABLE ZONE/SECTOR JUDGEMENT |
| (l) | PERCH CHANNEL NUMBER |
| (m) | POSITION REGISTRATION TIMER |
| (n) | EXTENDED INFORMATION FACTOR LENGTH |
| (o) | (EXTENDED INFORMATION FACTOR) |

| OUTPUT OF MOBILE STATION P2 | COMMUNICATION LEVEL Lth2 |
|---|---|
| 3 W | 8 dBμ |
| 2 W | 8 dBμ |
| 0.8 W | 9 dBμ |
| 0.3 W | 13.3 dBμ |

| OUTPUT OF MOBILE STATION P2 | COMMUNICATION OUT LEVEL Lth2' |
|---|---|
| 3 W | 2 dBμ |
| 2 W | 2 dBμ |
| 0.8 W | 3 dBμ |
| 0.3 W | 7.3 dBμ |

FIG. 10

| | |
|---|---|
| MESSAGE SORT | (a) |
| NETWORK NUMBER | (b) |
| REGULATORY INFORMATION | (c) |
| CONTROL CHANNEL STRUCTURE INFORMATION | (d) |
| MOBILE STATION TRANSMISSION POWER DESIGNATION | (e) |
| COMMUNICATION LEVEL BY TRANSMISSION OUTPUT OF MOBILE STATION | (f) |
| COMMUNICATION OUT LEVEL BY TRANSMISSION OUTPUT OF MOBILE STATION | (g) |
| POSITION REGISTRATION AREA MULTIPLEX NUMBER | (h) |
| POSITION NUMBER | (i) |
| NUMBER OF MAXIMUM REPORT CHANNELS | (j) |
| PERCH CHANNEL NUMBER FOR COMMUNICABLE ZONE/SECTOR JUDGEMENT | (k) |
| PERCH CHANNEL NUMBER | (l) |
| POSITION REGISTRATION TIMER | (m) |
| EXTENDED INFORMATION FACTOR LENGTH | (n) |
| (EXTENDED INFORMATION FACTOR) | (o) |

| OUTPUT OF MOBILE STATION P2 | COMMUNICATION LEVEL Lth 2 |
|---|---|
| 3 W | 8 dBμ |
| 2 W | 9.7 dBμ |
| 0.8 W | 13.7 dBμ |
| 0.3 W | 18.0 dBμ |

| OUTPUT OF MOBILE STATION P2 | COMMUNICATION OUT LEVEL Lth2' |
|---|---|
| 3 W | 2 dBμ |
| 2 W | 3.7 dBμ |
| 0.8 W | 7.7 dBμ |
| 0.3 W | 12.0 dBμ |

FIG. 21

| | |
|---|---|
| MESSAGE SORT | (a) |
| NETWORK NUMBER | (b) |
| REGULATORY INFORMATION | (c) |
| CONTROL CHANNEL STRUCTURE INFORMATION | (d) |
| MOBILE STATION TRANSMISSION POWER DESIGNATION | (e) |
| COMMUNICATION LEVEL BY TRANSMISSION OUTPUT OF MOBILE STATION | (f) |
| COMMUNICATION OUT LEVEL BY TRANSMISSION OUTPUT OF MOBILE STATION | (g) |
| POSITION REGISTRATION AREA MULTIPLEX NUMBER | (h) |
| POSITION NUMBER | (i) |
| NUMBER OF MAXIMUM REPORT CHANNELS | (j) |
| PERCH CHANNEL NUMBER FOR COMMUNICABLE ZONE/SECTOR JUDGEMENT | (k) |
| PERCH CHANNEL NUMBER | (ℓ) |
| POSITION REGISTRATION TIMER | (m) |
| EXTENDED INFORMATION FACTOR LENGTH | (n) |
| (EXTENDED INFORMATION FACTOR) | (o) |

Expansion of (f):

| 1 | COMMUNICATION LEVEL FOR 3W MACHINE |
| 2 | COMMUNICATION LEVEL FOR 2W MACHINE |
| 3 | COMMUNICATION LEVEL FOR 0.8W MACHINE |
| 4 | COMMUNICATION LEVEL FOR 0.3W MACHINE |

Expansion of (g):

| 1 | COMMUNICATION OUT LEVEL FOR 3W MACHINE |
| 2 | COMMUNICATION OUT LEVEL FOR 2W MACHINE |
| 3 | COMMUNICATION OUT LEVEL FOR 0.8W MACHINE |
| 4 | COMMUNICATION OUT LEVEL FOR 0.3W MACHINE |

FIG. 22

| BASE STATION (1W TRANSMISSION) | PROPAGATION LOSS | MOBILE STATION |
|---|---|---|
| TRANSMISSION OUTPUT : 143 dBμ<br>RECEIVING LEVEL : 12.7 dBμ | (1a) →<br>135 dB LOSS<br>← (2') | 3W MACHINE<br>RECEIVING LEVEL : 8 dBμ<br>TRANSMISSION OUTPUT : 147.7 dBμ |
| TRANSMISSION OUTPUT : 143 dBμ<br>RECEIVING LEVEL : 11 dBμ | (1b) →<br>135 dB LOSS<br>← (3') | 2W MACHINE<br>RECEIVING LEVEL : 8 dBμ<br>TRANSMISSION OUTPUT : 146.0 dBμ |
| TRANSMISSION OUTPUT : 143 dBμ<br>RECEIVING LEVEL : 8 dBμ | (1c) →<br>134 dB LOSS<br>← (4') | 0.8W MACHINE<br>RECEIVING LEVEL : 9 dBμ<br>TRANSMISSION OUTPUT : 142.0 dBμ |
| TRANSMISSION OUTPUT : 143 dBμ<br>RECEIVING LEVEL : 8 dBμ | (1d) →<br>129.7 dB LOSS<br>← (5') | 0.3W MACHINE<br>RECEIVING LEVEL : 13.3 dBμ<br>TRANSMISSION OUTPUT : 137.7 dBμ |

FIG. 23

| BASE STATION (3W TRANSMISSION) | PROPAGATION LOSS | MOBILE STATION |
|---|---|---|
| TRANSMISSION OUTPUT: 147.7 dBμ<br>RECEIVING LEVEL : 8 dBμ | (6a)<br>↑ 139.7 dB LOSS<br>↓ (7') | 3W MACHINE<br>RECEIVING LEVEL : 8 dBμ<br>TRANSMISSION OUTPUT: 147.7 dBμ |
| TRANSMISSION OUTPUT: 147.7 dBμ<br>RECEIVING LEVEL : 8 dBμ | (6b)<br>↑ 138 dB LOSS<br>↓ (8') | 2W MACHINE<br>RECEIVING LEVEL : 9.7 dBμ<br>TRANSMISSION OUTPUT: 146.0 dBμ |
| TRANSMISSION OUTPUT: 147.7 dBμ<br>RECEIVING LEVEL : 8 dBμ | (6c)<br>↑ 134 dB LOSS<br>↓ (10') | 0.8W MACHINE<br>RECEIVING LEVEL : 13.7 dBμ<br>TRANSMISSION OUTPUT: 142.0 dBμ |
| TRANSMISSION OUTPUT: 147.7 dBμ<br>RECEIVING LEVEL : 8 dBμ | (6d)<br>↑ 129.7 dB LOSS<br>↓ (9') | 0.3W MACHINE<br>RECEIVING LEVEL : 18 dBμ<br>TRANSMISSION OUTPUT: 137.7 dBμ |

MOBILE COMMUNICATION SYSTEM AND METHOD FOR PERFORMING COMMUNICATION CONTROL WITHIN A BASE STATION AND A MOBILE STATION

BACKGROUND OF THE INVENTION

1) Field of the Invention

The present invention relates to a mobile communication system for digital automobile telephones or the like. Particularly, the present invention relate to a mobile communication system for digital automobile telephone services, a communication control method for a mobile communication system, a base station in a mobile communication system, and a mobile station in a mobile communication system.

2) Description of the Related Art

In general digital automobile telephone systems, concepts about communication level and communication out level have been employed.

The communication level means a receiving level at which waiting is permitted so that the receiving level of each mobile station allows communications to a base station without any trouble.

The communication out level means a receiving level which is judged that a mobile station is out of communicable zone when the receiving level of the mobile station in communication state is less than a communication out level.

A base station transmits only one communication level and one communication out level. If a mobile station has a receiving level more than a communication level, it is displayed that the mobile station is in a communicable zone, thus performing originating and destination calls. If the receiving level is not less than a communication out level, the mobile station once entering a communicable zone can perform originating and destination calls. If the receiving level is less than a communication out level, it is displayed that the mobile station is out of a communicable zone so that the originating and destination calls cannot be established.

In other words, the mobile station within the area for a base station depends on only a down receiving level value (or judged only at a down receiving level) to judge whether the receiving level is a communication level or communication out level level. Hence the up receiving level (the receiving level received by a base station while a mobile station originates) is not used as a communication control judgment.

In the current mobile communication systems, it cannot be assured that the communication qualities in up and down directions are well-balanced in view of system design (line design). The transmission output of a mobile station depends on a variety of transportable machine, portable machine, and mobile stations.

Now let us consider that the transmission output of a mobile station is considerably smaller than that of the base station. Even if the down link (from a base station to a mobile station) has a receiving level sufficient in the connection or communication quality, a question in a connection quality such as an erroneous connection of an originating signal may occur or a question in communication quality such as a bad up-link connection may occur, because of the small transmission output of the up link (from the mobile station to the base station).

Let us consider the cases, for example, shown in FIG. 24. When the base station has its transmission power of 1.0 W (electric field intensity 30 dBm: 143 dB$\mu$V) and its propagation loss is 135 dB, the receiving level of the mobile station is 8 dB$\mu$V, thus satisfying the desired quality of the down transmission (1).

In consideration of the up transmission (2) with the transmission output of the mobile station of 3.0 W (electric field intensity 34.7 dBm: 147.7 dB$\mu$V), the receiving level of the base station is 12.7 dB$\mu$V, whereby the desired quality in an up link is satisfied.

In consideration of the up transmission (3) with the transmission output of the mobile station of 2.0 W (electric field intensity 33.0 dBm: 146.0 dB$\mu$V), the receiving level of the base station is 11.0 dB$\mu$V, whereby the desired quality in an up link is satisfied.

In consideration of the up transmission (4) with the transmission output of the mobile station of 0.8 W (electric field intensity 29.0 dBm: 142.0 dB$\mu$V), the receiving level of the base station is 7.0 dB$\mu$V, whereby the desired quality in an up link is not satisfied.

In consideration of the up transmission (5) with the transmission output of the mobile station of 0.3 W (electric field intensity 24.7 dBm: 137.7 dB$\mu$V), the receiving level of the base station is 2.7 dB$\mu$V, whereby the desired quality is not satisfied.

As described above, there are the case where the transmission output of the mobile station side satisfies the quality in an up link and the case where the transmission output of the mobile station side does not satisfy the quality in an up link.

Next, the case shown in FIG. 25 is considered. With the transmission output of the base station of 3.0 W (electric field intensity 34.7 dBm: 147.7 dB$\mu$V) and the propagation loss of 139.7 dB, the receiving level of the mobile station is 8 dB$\mu$V, whereby the desired quality in the down transmission (6) is satisfied.

In consideration of the up transmission (7) with the transmission output of the mobile station of 3.0 W (electric field intensity 34.7 dBm: 147.7 dB$\mu$V), the receiving level of the base station is 8.0 dB$\mu$V, whereby the desired quality is satisfied in an up link.

In consideration of the up transmission (8) with the transmission output of the mobile station of 2.0 W (electric field intensity 33.0 dBm: 146.0 dB$\mu$V), the receiving level of the base station is 6.3 dB$\mu$E, whereby the desired quality is not satisfied in an up link.

In consideration of the up transmission (9) with the transmission output of the mobile station of 0.3 W (electric field intensity 24.7 dBm: 137.7 dB$\mu$V), the receiving level of the base station is −1.9 dB$\mu$V, whereby the desired quality is not satisfied in an up link.

As described above, even when the transmission output of the base station is as high as 3.0 W, there are the case where the transmission output of the mobile station satisfies the quality in up link and the case where the transmission output of the mobile station does not satisfy the quality in up link.

SUMMARY OF THE INVENTION

The present invention is made to overcome the above mentioned problems. An object of the present invention is to provide a mobile communication system that can ensure always a desired communication quality in up and down directions.

Another object of the present invention is to provide a communication control method used in a mobile communication system that can ensure always a desired communication quality in up and down directions.

Still another object of the present invention is to provide a base station used in a mobile communication system that can ensure always a desired communication quality in up and down directions.

Further another object of the present invention is to provide a mobile station used in a mobile communication system that can ensure always a desired communication quality in up and down directions.

In order to achieve the above objects, according to the present invention, the mobile communication system is characterized by a base station and a mobile station, the base station including broadcasting means that reports information to the mobile station, the information being considered in a transmission output difference to the mobile station; the mobile station including receiving means that receives the broadcast information reported from the broadcasting means of the base station and control means that controls with communication control information of each of the mobile stations according to the broadcast information received by the receiving means and implements a communication control when a desired receiving level is bidirectionally obtained between the base station and the mobile station.

According to the present invention, the mobile communication system has a simple configuration and can provide the following effect and advantage.

(1) Good line quality and communication quality can be obtained in the up and down directions without depending on the difference in transmission output between the base station and the mobile station. This feature greatly contributes to improved services in mobile communication systems such as digital automobile telephones.

(2) Even if a current base station is switched by a channel switching and a zone shifting, broadcast information is immediately received from a switched base station, so that communication control can be performed using plural pieces of communication control information according to the transmission output after the switching operation, or communication control can be performed using a correction value that corrects uniform communication control information. Hence good quality can be obtained in the up and down directions even when communication is established to any base station.

According to the present invention, the communication control method in a mobile communication system including a base station and a mobile station is characterized by the steps of controlling communication control information in the mobile station, according to a transmission output difference between the base station and the mobile station; and performing a communication control when a desired receiving level is bidirectionally obtained between the base station and the mobile station.

According to the present invention, the communication control method in the mobile communication system has a simple configuration and can provide the following effect and advantage.

(1) Good line quality and communication quality can be obtained in the up and down directions without depending on the difference in transmission output between the base station and the mobile station. This feature greatly contributes to improved services in mobile communication systems such as digital automobile telephones.

(2) Even if a current base station is switched by a channel switching and a zone shifting, broadcast information is immediately received from a switched base station, so that communication control can be performed using plural pieces of communication control information according to the transmission output after the switching operation, or communication control can be performed using a correction value that corrects uniform communication control information. Hence good quality can be obtained in the up and down directions even when communication is established to any base station.

Furthermore, according to the present invention, the base station in a mobile communication system, the base station including a base station and a mobile station, is characterized by broadcasting means for reporting information to the mobile station, the information being considered in a transmission output difference to the mobile station.

According to the present invention, the base station in the mobile communication system has a simple configuration and can provide the following effect and advantage.

(1) Good line quality and communication quality can be obtained in the up and down directions without depending on the difference in transmission output between the base station and the mobile station. This feature greatly contributes to improved services in mobile communication systems such as digital automobile telephones.

(2) Even if a current base station is switched by a channel switching and a zone shifting, broadcast information is immediately received from a switched base station, so that communication control can be performed using plural pieces of communication control information according to the transmission output after the switching operation, or communication control can be performed using a correction value that corrects uniform communication control information. Hence good quality can be obtained in the up and down directions even when communication is established to any base station.

According to the present invention, the mobile station in a mobile communication system including a base station and a mobile station is characterized by receiving means for receiving broadcast information, in which a transmission output difference to the mobile station is considered, reported from the base station; and control means for controlling with communication control information of each mobile station, according to broadcast information received by the receiving means, and implementing a communication control when a desired receiving level is bidirectionally obtained between the base station and the mobile station.

According to the present invention, the mobile station in the mobile communication system has a simple configuration and can provide the following effect and advantage.

(1) Good line quality and communication quality can be obtained in the up and down directions without depending on the difference in transmission output between the base station and the mobile station. This feature greatly contributes to improved services in mobile communication systems such as digital automobile telephones.

(2) Even if a current base station is switched by a channel switching and a zone shifting, broadcast information is immediately received from a switched base station, so that communication control can be performed using plural pieces of communication control information according to the transmission output after the switching operation, or communication control can be performed using a correction value that corrects uniform communication control information. Hence good quality can be obtained in the up and down directions even when communication is established to any base station.

BRIEF DESCRIPTION OF THE DRAWINGS

FIG. 9 is a schematic diagram showing an example of the broadcast information configuration according to an embodiment of the present invention;

FIG. 10 is a schematic diagram showing an example of the broadcast information configuration according to an embodiment of the present invention;

FIG. 21 is a schematic diagram showing an example of the broadcast information configuration according to an embodiment of the present invention;

FIG. 22 is a schematic diagram showing an example of an operational state of an embodiment according to the present invention;

FIG. 23 is a schematic diagram showing another example of the operational state of an embodiment according to the present invention;

DESCRIPTION OF THE PREFERRED EMBODIMENTS (a) Aspect of Invention

First an aspect of the present invention will be described below with reference to the attached drawings.

Figure 1:
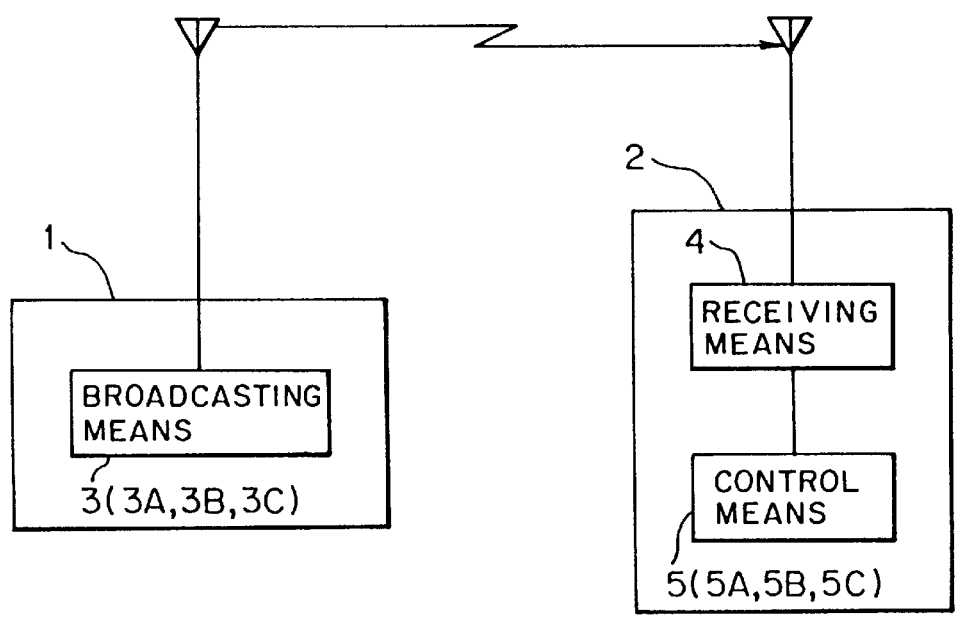
FIG. 1 is a block diagram showing an aspect of the present invention.

The mobile communication system according to the present invention is constructed like the block diagram showing the aspect in FIG. 1. Referring to FIG. 1, numeral 1 represents a base station and 2 represents a mobile station.

This mobile communication system includes the base station 1 and the mobile station 2.

Numeral 3 represents broadcasting means. The broadcasting means 3 is arranged in the base station 1 to broadcast information considering the transmission output difference to the mobile station 2, to the mobile station 2.

Numeral 4 represents receiving means. The receiving means 4 is arranged in the mobile station 2 to receive broadcast information reported from the broadcasting means 3 in the base station 1.

Numeral 5 represents control means. The control means 5 controls with communication control information from each mobile station 2 according to broadcast information received by the receiving means 4 and implements a communication control when a predetermined receiving level is bidirectionally satisfied between the mobile station 2 and the base station 1.

Figure 2:
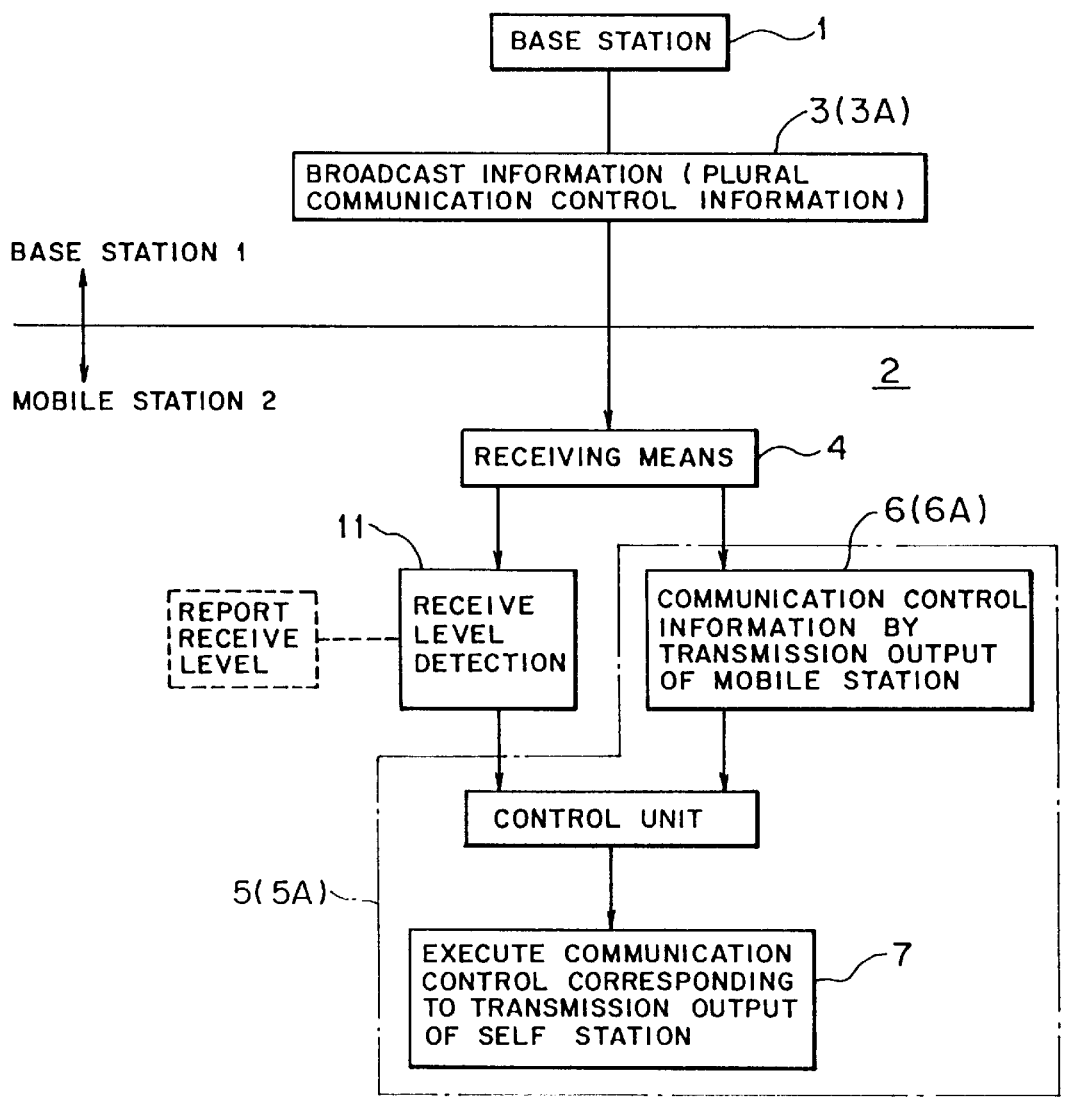
FIG. 2 is a schematic diagram used for explaining the function of the present invention.

In the mobile communication system according to the present invention, as shown in FIG. 2, the broadcasting means 3(3A) in the base station 1 is constituted as means that report plural pieces of communication control information according to the transmission output P2 of the mobile station 2. The mobile station 2 includes selecting means 6(6A) that selects communication control information corresponding to the transmission output P2 of the self station 2 among plural pieces of communication control information sent from the base station 1, and judging means 7 that judges whether the self station 2 implements a communication control according to the communication control information selected by the selecting means 6(6A).

Figure 3:
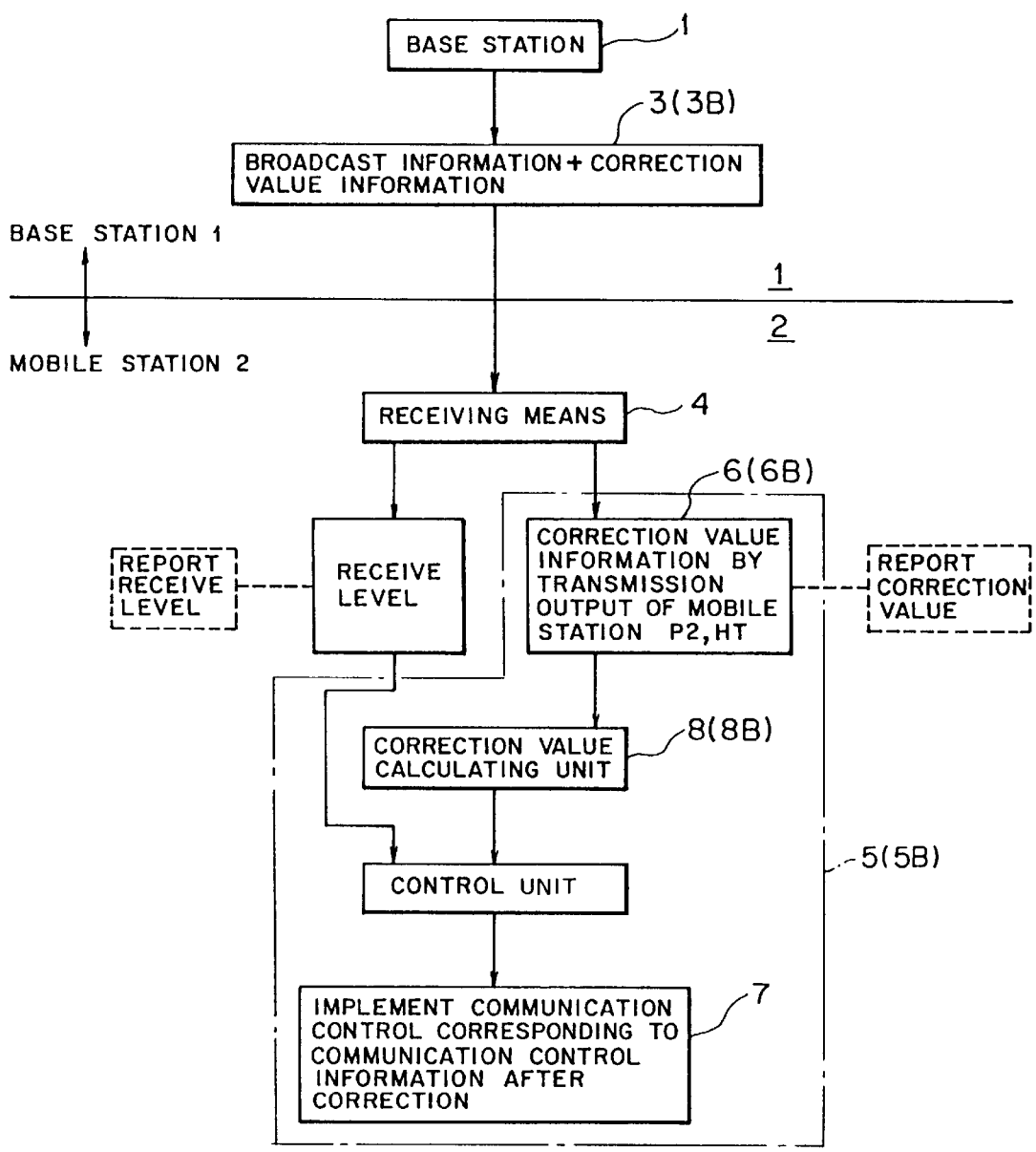
FIG. 3 is a schematic diagram used for explaining the function of the present invention.

In the mobile communication system according to the present invention, as shown in FIG. 3, the base station 1 includes broadcasting means 3(3B) that is constituted as means that reports fixed communication control information and plural pieces of correction value information H to correct communication control information, according to the transmission output P2 of the mobile station 2; and the mobile station 2 includes control means 5(5B), the control means 5(5B) includes selecting means 6(6B) that selects a correction value HT corresponding to the transmission output P2 of the self station 2 among communication control information and plural pieces of correction value information H sent from the base station 1, and discriminating means 7 that corrects the communication control information with the correction value HT selected by the selecting means 6(6B) (this correction is made by the correction value calculating unit 8(8B)) and then discriminates whether the self station 2 implements a communication control according to the corrected communication control information.

Figure 4:
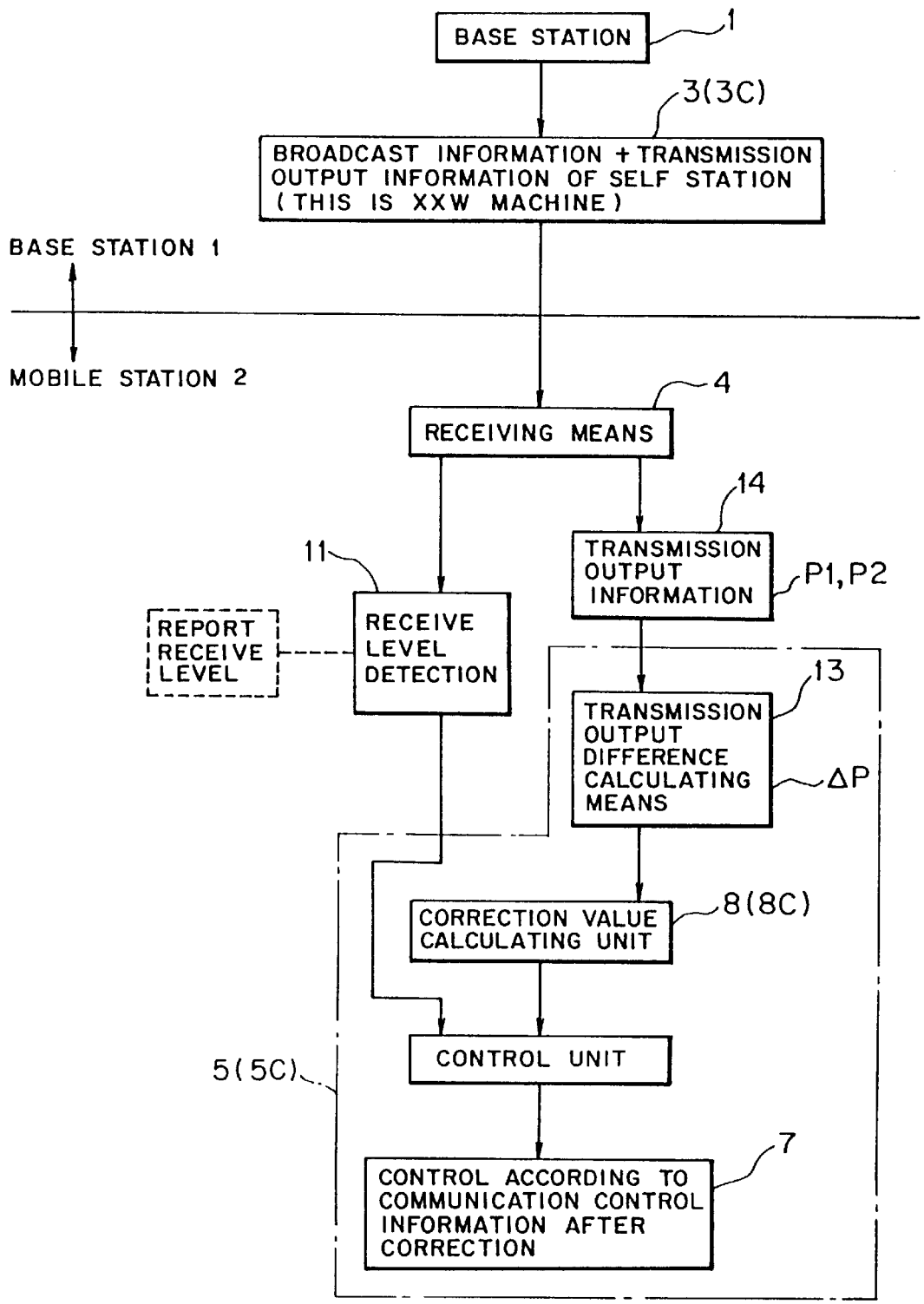
FIG. 4 is a schematic diagram used for explaining the function of the present invention.

Moreover, in the mobile communication system of the present invention, as shown in FIG. 4, the base station 1 includes broadcasting means 3(3C) that is constituted as means that reports the information regarding transmission output P1 of the base station 1 itself in addition to fixed communication control information. In the mobile station 2, the control means 5(5C) includes correcting means 8(8C)

that calculates a difference ΔP between the transmission output P1 of the base station 1 and the transmission output P2 of the mobile station 2 itself, based on the information regarding the transmission output P1 received by the base station 1 (this difference ΔP is calculated by the transmission output difference calculating means 13), and then corrects communication control information, using the difference ΔP as a correction value HT, and discriminating means 7 that discriminates whether the self station performs a communication control according to communication control information obtained after correction by the correcting means 8(8C).

In the mobile communication system of the present invention, in the mobile station 2, the control means 5(5C) is constituted as means that establishes a communication permission on the condition that the receiving level of the self station 2 is more than a predetermined communication level and the receiving level corrected with the transmission output difference ΔP between the transmission output of the base station 1 and the transmission output of the self station 2 is more than the communication level. In the mobile station 2, the control means 5(5C) establishes a communication out level on the condition that the receiving level corrected with the transmission output difference ΔP between the transmission output of the base station 1 and the transmission output of the self station 2 is less than the predetermined communication out level.

According to the present invention, the communication control means in a mobile communication system includes the following procedures.

The mobile communication system including the base station 1 and the mobile station 2 includes the steps of considering the transmission output difference between the base station 1 and the mobile station 2 (procedure 1), controlling with communication control information from each of the mobile station 2 (procedure 2), and performing a communication control when a predetermined receiving level is bidirectionally satisfied between the mobile station 2 and the base station 1 (procedure 3).

Furthermore, according to the present invention, the communication control means in a mobile communication system includes the following procedures.

In the base station 1, plural pieces of communication control information is reported according to the transmission output P2 of the mobile station 2 (procedure 4). In the mobile station 2, the communication control information corresponding to the transmission output P2 of the self station 2 is selected among plural pieces of communication control information sent from the base station 1 (procedure 5). It is judged whether the self station 2 implements a communication control according to the selected communication control information (procedure 6).

Moreover, according to the present invention, the communication control method in a mobile communication system includes the following procedures.

In the base station 1, fixed communication control information and plural pieces of correction value information H for communication control information correction are reported according to the transmission output P2 from the mobile station 2 (procedure 7). In the mobile station 2, a correction value HT corresponding to the transmission output P2 of the self station 2 is selected among communication control information received from the base station 1 and plural pieces of correction value information H (procedure 8). The communication control information is corrected with the selected correction value HT to judge whether the self station 2 performs a communication control according to the communication control information after correction (procedure 9).

According to the present invention, the communication control method in a mobile communication system includes the following procedures.

In the base station 1, information regarding the transmission output P1 of the self station 1 itself is reported together with fixed communication control information (procedure 10). In the mobile station 2, the difference ΔP between the transmission output Pi of the base station 1 and the transmission output P2 of the mobile station 2 is calculated based on the information regarding the transmission output P1 sent from the base station 1 (procedure 11). The communication control information is corrected using the difference ΔP as a correction value (procedure 12). It is judged whether the self station 2 performs the communication control according to the communication control information after correction (procedure 13).

According to the present invention, the communication control method in a mobile communication system includes the following procedures.

The mobile station 2 establishes communication permission on the condition that the receiving level of the self station 2 is more than a predetermined communication level and the receiving level corrected with the transmission output difference ΔP between the transmission output of the base station 1 and the transmission output of the self station 2 is more than the communication level (procedure 14).

In the mobile station 2, a communication out level is established on the condition that the receiving level corrected with the transmission output difference ΔP between the base station 1 and the self station 2 is less than a predetermined communication out level level (procedure 15).

According to the present invention, as shown in FIG. 2, in a mobile communication system including the base station 1 and the mobile station 2, the broadcasting means 3 arranged in the base station 1 reports information considering the transmission output difference to the mobile station 2, to the mobile station 2. The receiving means 4 arranged in the mobile station 2 receives broadcast information sent from the broadcasting means 3 in the base station 1. The control means 5 controls with communication control information according to the transmission output of the mobile station 2. Thus a communication control is performed when a predetermined receiving level is bidirectionally satisfied between the mobile station 2 and the base station 1.

According to the present invention, in the mobile communication system, as shown in FIG. 2, the broadcasting means 3(3A) in the base station 1 reports plural pieces of communication control information according to the transmission output P2 of the mobile station 2. In the control means 5(5A) in the mobile station 2, the selecting means 6(6A) selects communication control information corresponding to the transmission output P2 of the self station 2 itself among plural pieces of communication control information sent from the base station 1. The discriminating means 7 discriminates whether the self station 2 performs a communication control according to the communication control information selected by the selecting means 6(6A).

In the mobile communication system according to the present invention, as shown in FIG. 3, the broadcasting means 3(3B) in the base station 1 reports fixed communication control information and plural pieces of correction value information H for communication control information correction according to the transmission output P2 of the mobile station 2. In the control means 5(5B) in the mobile station 2, the selecting means 6(6B) selects the correction value HT corresponding to the transmission output P2 of the self station 2 among communication control information and plural pieces of correction value information H sent from the base station 1, and then corrects the communication control information using the selected correction value HT. The discriminating means 7 discriminates whether the self station 2 performs a communication control according to the corrected communication control information.

Moreover, in the mobile communication system according to the present invention, as shown in FIG. 4, the broadcasting means 3(3C) in the base station 1 reports information regarding the transmission output P1 of the base station 1 itself in addition to fixed communication control information. In the mobile station 2, the control means 5(5C) calculates the difference $\Delta P$ between the transmission output P1 of the base station 1 and the transmission output P2 of the mobile station 2 itself, based on the information regarding the transmission output P1 of the base station 1. The correcting means 8(8C) corrects the communication control information using the difference $\Delta P$ as a correction value HT. The discriminating means 7 discriminates whether the self station performs a communication control according to the communication control information corrected by the correcting means 8(8C).

In the mobile communication system of the present invention, as shown in FIG. 4, the control means 5(5C) in the mobile station 2 judges a communication state on the condition that the receiving level of the self station 2 is more than a predetermined communication level and the receiving level corrected with the difference $\Delta P$ in transmission output between the base station 1 and the self station 2 is more than the communication level. The control means 5(5C) in the mobile station 2 also judges a communication inhibition state on the condition that the receiving level of the self station 2 corrected with the difference $\Delta P$ in transmission output between the base station 1 and the self station 2 is less than the communication out level level.

In the communication control method in a mobile communication system according to the present invention, the configuration shown in FIG. 2 operates according to the following procedures. First, in the mobile communication system including the base station 1 and the mobile station 2, where a predetermined receiving level is bidirectionally satisfied for the base station 1 and the mobile station 2 by considering the transmission output difference between the base station 1 and the mobile station 2 and controlling it with the communication control information from each mobile station 2, a communication control is performed.

In the communication control method in a mobile communication system, the configuration shown in FIG. 2 operates according to the following procedures. That is, in the base station 1, plural pieces of communication control information are reported according to the transmission output P2 of the mobile station 2. In the mobile station 2, communication control information corresponding to the transmission output P2 of the self station 2 is selected among plural pieces of communication control information sent by the base station 1 and then it is discriminated whether the self station 2 perform the communication control according to the selected communication control information.

Furthermore, in the communication control method in a mobile communication system, the configuration shown in FIG. 3 operates according to the following procedures. That is, in the base station 1, fixed communication control information and plural pieces of correction value information H for a communication control information correction are reported according to the transmission output P2 of the mobile station 2. In the mobile station 2, the correction value HT corresponding to the transmission output P2 of the self station 2 is selected according to the communication control information and plural pieces of correction value information H received from the base station 1. The communication control information is corrected with the selected correction value HT. It is discriminated whether the self station 2 performs a communication control according to the corrected communication control information.

In the communication control method in a mobile communication system of the present invention, the configuration shown in FIG. 4 operates according to the following procedures. That is, in the base station 1, information regarding the transmission output P1 of the base station 1 itself according to the transmission output P2 from the mobile station 2, in addition to fixed communication control information, is reported. In the mobile station 2, the difference $\Delta P$ between the transmission output P1 of the base station 1 and the transmission output P2 of the mobile station 2 itself is calculated based on the information regarding the transmission output P1 of the base station 1. The communication control information is corrected using the difference $\Delta P$ as a correction value. It is discriminated whether the self station 2 performs a communication control according to the communication control information after correction.

In the communication control method in a mobile communication system of the present invention, the configuration shown in FIG. 4 operates according to the following procedures. That is, in the mobile station 2, where the receiving level of the self station 2 is more than a predetermined communication level and the receiving level corrected with the transmission output difference $\Delta P$ between the base station 1 and the self station 2 is more than the communication level, the communication permission state is established.

Furthermore, in the communication control method in a mobile communication system of the present invention, the configuration shown in FIG. 4 operates according to the following procedures. That is, in the mobile station 2, where the receiving level corrected with the transmission output difference $\Delta P$ between the base station 1 and the self station 2 is less than a predetermined degradation level, the communication out level state is established.

As described above, according to the mobile communication system of the present invention shown with FIG. 1, the mobile communication system includes the base station 1 and the mobile station 2. The base station 1 includes broadcasting means 3 that reports information considering the transmission output difference to the mobile station 2, to the mobile station 2. The mobile station 2 includes receiving means 4 that receives broadcast information reported from the broadcasting means 3 in the base station 1, and the control means 5 that controls with the communication control information for each mobile station 2 according to the broadcast information received by the receiving means 4 and performs a communication control when a predetermined receiving levels is bidirectionally satisfied between the mobile station 2 and the base station 1. This simplified configuration has the following effects or advantages.

(1) The line quality and communication quality can be improved in the directions of the up/down streams without depending on the difference in transmission output between the base station 1 and the mobile station 2. Hence, this feature leads to greatly-improved services in mobile communication systems such as digital automobile telephones.

(2) Even if the base station 1 is changed due to a channel switching, a zone changing, or the like, the broadcast information from the base station 1 is quickly received after the switching operation so that a communication control can be performed according to the plural pieces of communication control information according to the transmission output after the switching operation or a correction value for uniform communication control information correction. Hence in communications to any base station 1, good quality can be obtained in up and down directions.

According to the embodiments of the mobile communication system of the present invention shown in FIG. 2, in the above-mentioned invention, the broadcasting means 3(3A) in the base station 1 is constituted as means that reports plural pieces of communication control information according to the transmission output of the mobile station 2. In the mobile station 2, the control means 5(5A) includes the selecting means 6(6A) that selects communication control information corresponding to the transmission output of the self station 2 among plural pieces of communication control information sent from the base station 1 and the discriminating means 7 that discriminates whether the self station 2 performs a communication control according to the communication control information selected by the selecting means 6(6A). This simplified configuration can provide the following effects or advantages, in addition to the effects of the above-mentioned invention.

(3) The communication control information corresponding to the transmission output of the self station 2 can be easily selected among plural pieces of communication control information sent from the base station 1.

Moreover, according to the embodiment of the mobile communication system of the present invention shown in FIG. 3 in the invention shown with FIG. 1, the broadcasting means 3(3B) in the base station 1 is constituted as means that reports fixed communication control information and plural pieces of correction value information to correct the communication control information, according to the transmission output of the mobile station 2. In the mobile station 2, the control means 5(5B) includes the selecting means 6(6B) that selects the correction value corresponding to the transmission output of the self station 2 among communication control information and plural pieces of correction value information sent from the base station 1, and the discriminating means 7 that corrects the communication control information according to the correction value selected by the selecting means 6(6B) and discriminates whether the self-station 2 performs a communication control according to the communication control information after the correction. This compact configuration can provide the following effects or advantages, in addition to the effects of the invention described with FIG. 1.

(4) The correction value corresponding to the transmission output of the self station 2 is selected, based on plural pieces of correction value information received from the base station 1. Thus the communication control information can be easily corrected by the selected correction value.

According to the mobile communication system of the present invention described with FIG. 4, in the invention shown in FIG. 1, the broadcasting means 3(3C) in the base station 1 is constituted as means that reports transmission output information of the base station 1 itself in addition to fixed communication control information, according to the transmission output of the mobile station 2. In the mobile station 2, the control means 5(5C) includes the correcting means 8(8C) that calculates the difference between the transmission output of the base station 1 and the transmission output of the mobile station 2, based on the transmission output information sent from the base station 1 and then corrects the communication control information using the difference as a correction value, and the discriminating means 7 that discriminates whether the self-station 2 performs a communication control according to the corrected value obtained by the correcting means 8(8C). This compact configuration can provide the following effects or advantages, in addition to the effects of the invention described with FIG. 1.

(5) The communication control corresponding to the transmission output of the self station 2 can be surely discriminated by calculating the difference between the transmission output of the base station 1 and the transmission output of the mobile station 2 itself and then correcting the communication control information using the difference value as a correction value.

According to the mobile communication system of the present invention, in the invention shown in FIG. 4, the control means 5(5C) in the mobile station 2 establishes a communication permission when the receiving level of the self station 2 is higher than a predetermined communication level and the receiving level corrected with the transmission output difference between the base station 1 and the self station 2 is higher than the communication level. This simple configuration can surely decide communication permission, in addition to the effects of the invention described with FIG. 3.

Moreover, according to the mobile communication system of the present invention, in the invention shown in FIG. 4, the control means 5(5C) in the mobile station 2 inhibits waiting when the receiving level corrected with the transmission output difference between the base station 1 and the self station 2 is lower than a predetermined communication out level level. This simplified configuration can certainly provide a communication permission judgment, in addition to the effect of the invention defined in claim 4.

According to the communication control method in a mobile communication system shown in FIG. 2, the mobile communication system with the base station 1 and the mobile station 2 can control the communication control information in the mobile station 2 according to the transmission output difference between the base station 1 and the mobile station 2. Hence this simple configuration, by which a communication control can be performed when a predetermined receiving level can be bidirectionally obtained between the mobile station 2 and the base station 1, can provide the following effects and advantages.

(6) Excellent line quality and communication quality can be established in up and down directions without depending on the transmission output difference between the base station 1 and the mobile station 2. Thus this feature greatly contributes to improved services in the mobile communication system such as digital automobile telephones.

(7) Even if the base station 1 is changed due to a channel switching and zone shifting operation, the broadcast information is quickly received from the switched base station 1. Thus a communication control can be performed with plural pieces of communication control information according to the transmission output after switching or a correction value to correct uniform communication control information. Hence in communications to any base station 1, good quality can be obtained in up and down directions.

According to the communication control method in a mobile communication system of the present invention shown in FIG. 2, the base station 1 reports plural pieces of communication control information according to the transmission output of the mobile station 2. The mobile station 2 selects the communication control information corresponding to the transmission output of the self station 2 among plural pieces of communication control information sent from the base station 1 and discriminates whether the self station 2 performs a communication control according to the selected communication control information. This simplified configuration can provide the following effects and advantages, in addition to the above-mentioned effects of the invention.

(8) The communication control information corresponding to the transmission output of the self station 2 can be easily selected among plural pieces of communication control information sent from the base station 1.

According to the communication control method in a mobile communication system shown in FIG. 3, the base station 1 reports fixed communication control information and plural pieces of correction value information to correct the communication control information. The mobile station 2 selects a correction value corresponding to the transmission output of the self station 2 among plural pieces of correction value information and communication control information sent from the base station 1, corrects the communication control information using the selected correction value, and discriminates whether the self station 2 performs a communication control according to the corrected communication control information. This simple configuration can provide the following effects and advantages, in addition to the above-described effects of the invention.

(9) A correction value corresponding to the transmission output of the self station 2 is selected among plural pieces of correction value information sent from the base station 1. The communication control information can be easily corrected with the selected correction value.

Furthermore, according to the communication control method in a mobile communication system of the invention shown in FIG. 3, the base station 1 reports transmission output information of the self station 1 itself, in addition to the fixed communication control information. The mobile station 2 calculates the difference between the transmission output of the base station 1 and the transmission output of the mobile station 2 itself among the transmission output information sent from the base station 1, corrects the communication control information using the difference value as a correction value, and discriminates whether the self station 2 performs a communication control using the corrected communication control information. This simple configuration can provide the following effects and advantages, in addition to the above-mentioned effect of the invention.

(10) The communication control corresponding to the transmission of the self station 2 can be surely discriminated by calculating the difference between the transmission output of the base station 1 and the transmission output of the mobile station 2 itself and correcting the communication control information using the difference value as a correction value.

According to the communication control method in a mobile communication system of the invention shown in FIG. 3, where the receiving level of the self station 2 is more than a predetermined communication level and the receiving level corrected with the transmission output difference between the base station 1 and the self station 2 is higher than a predetermined communication level, the mobile station 2 becomes communication permission. Hence a communication permission judgment can be surely performed.

According to the communication control method in a mobile communication system of the present invention, where the receiving level corrected with the transmission output difference between the base station 1 and the self station 2 is less than a predetermined communication out level level, the mobile station 2 becomes communication out level. Hence communication permission can be surely judged.

According to the base station 1 in a mobile communication system of the invention shown in FIG. 1, in the mobile communication system including the base station 1 and the mobile station 2, the base station 1 includes the broadcasting means 3 that reports information considering the transmission output difference to the mobile station 2 to the mobile station 2. This simple configuration provides the following effect and advantage.

(11) The line quality and the communication quality are excellent in the up and down directions without depending on the difference in transmission output between the base station 1 and the mobile station 2. This feature leads to greatly-improved services in a mobile communication system such as digital automobile telephones.

(12) Even if the base station 1 is changed due to the channel switching and zone shift, the broadcast information can be quickly received from the changed base station 1. Since the communication control can be performed with a correction value that corrects plural pieces of communication control information or uniform communication control information corresponding to the transmission output after the changing operation, good quality can be obtained in up and down directions at the time of communications to any base station 1.

Moreover, according to the base station 1 in a mobile communication system described with FIG. 2, the broadcasting means 3(3A) is constituted as means that reports plural pieces of communication control information according to the transmission output of the mobile station 2. This simple configuration provides the following effects and advantages, in addition to the above-mentioned effects of the invention.

(13) Communication control information corresponding to the transmission output of the self station 2 can be easily selected among plural pieces of communication control information sent from the base station 1.

According to the base station 1 in a mobile communication system described with FIG. 3, the broadcasting means 3(3B) is formed as means that reports fixed communication control information and plural pieces of correction value information for correcting the communication control information, according to the transmission output of the mobile station 2. This compact configuration provides the following effect and advantage, in addition to the above-mentioned effects of the invention.

(14) A correction value corresponding to the transmission output of the self station 2 can be selected among plural pieces of correction value information sent from the base station 1. Hence the communication control information can be easily corrected using the selected correction value.

According to the base station 1 in a mobile communication system described with FIG. 4, the broadcasting means 3(3C) is constituted as means that reports transmission output information of the base station 1 itself, in addition to the fixed communication control information. This simple configuration provides the following effect and advantage, in addition to the above-mentioned effects of the invention.

(15) The communication permission corresponding to the transmission output of the self station 2 can be surely judged by calculating the difference between the transmission output of the base station 1 and the transmission output of the mobile station 2 itself and then correcting the communication control information using the difference value as a correction value.

Furthermore, according to the mobile station 2 in a mobile communication system described with FIG. 1, the mobile station 2 in the mobile communication system including the base station 1 and the mobile station 2 includes receiving means 4 that receives broadcast information reported from the base station 1, information considering the transmission output difference to the mobile station 2, and the control means 5 that controls with communication control information to each mobile station 2 according to the broadcast information received by the receiving means 4 and performs a communication control when a predetermined receiving level is obtained bidirectionally between the mobile station 2 and the base station 1. This simple configuration can provide the following effect and advantage.

(16) The good line and communication quality can be obtained in up and down directions without depending on the difference in transmission output between the base station 1 and the mobile station 2. This feature greatly contributes to improved services in the mobile communication systems such as digital automobile telephones.

(17) Even if the base station 1 is changed due to the channel switching and zone shift, the broadcast information can be quickly received from the changed base station 1. Since the communication control can be performed with a correction value that corrects plural pieces of communication control information or uniform communication control information corresponding to the transmission output after the changing operation, good quality can be obtained in up and down directions at the time of communications to any base station 1.

According to the mobile station 2 in a mobile communication system of the invention described with FIG. 2, the control means 5(5A) includes selecting means 6(6A) that selects the communication control information corresponding to the transmission output of the self station 2 among plural pieces of communication control information sent from the base station 1, and discriminating means 7 that discriminates whether the self station 2 performs a communication control according to the communication control information selected by the selecting means 6(6A). This simple configuration can provide the following effect and advantage, in addition to the above-mentioned effects of the invention.

(18) The communication control information corresponding to the transmission output of the self station 2 can be easily selected among plural pieces of communication control information sent from the base station 1.

According to the mobile station 2 in a mobile communication system described in FIG. 3, the control means 5(5B) includes selecting means 6(6B) that selects a correction value corresponding to the transmission output of the self station 2 among communication control information and plural pieces of correction value information sent from the base station 1, and discriminating means 7 that corrects the communication control information using the correction value selected by the selecting means 6(6B) and discriminates whether the self station 2 performs a communication control according to the communication control information after the correction. This simple configuration can provide the following effect and advantage, in addition to the above-mentioned effects of the invention.

(19) A correction value corresponding to the transmission output of the self station 2 can be easily selected among plural pieces of correction value information sent from the base station 1. Hence the communication control information can be corrected using the selected correction value.

According to the mobile station 2 in a mobile communication system of the present invention described with FIG. 4, the control means 5(5C) includes correcting means 8(8C) that calculates the difference between the transmission output of the base station 1 and the transmission output of the mobile station 2 itself by the transmission output information sent from the base station 1 and then corrects the communication control information using the difference value as a correction value, and discriminating means 7 that discriminates whether the self station 2 performs a communication control according to the corrected communication control information obtained by the correcting means 8(8C). This simple configuration can provide the following effect and advantage, in addition to the above-mentioned effects of the invention.

(20) The communication control corresponding to the transmission output of the self station 2 can be surely judged by calculating the difference between the transmission output of the base station 1 and the transmission output of the mobile station 2 itself and then correcting the communication control information using the difference value as a correction value.

According to the mobile station 2 in a mobile communication system of the invention described with FIG. 4, the control means 5(5C) is constituted as means that permits waiting when the receiving level of the self station 2 is more than a predetermined communication level and the receiving level corrected with the transmission output difference between the base station 1 and the self station 2 is more than the communication level and the judgement of the transmission permission is surely performed.

According to the mobile station 2 in a mobile communication system of the invention described above, the control means 5(5C) inhibits waiting when the receiving level corrected with the transmission output difference between the base station 1 and the self station 2 is less than a predetermined communication out level level. Hence the communication permission can be certainly judged.

(b) An Embodiment of the Present Invention

Next an embodiment according to the present invention will be described below with reference to the attached drawings.

Figure 5:
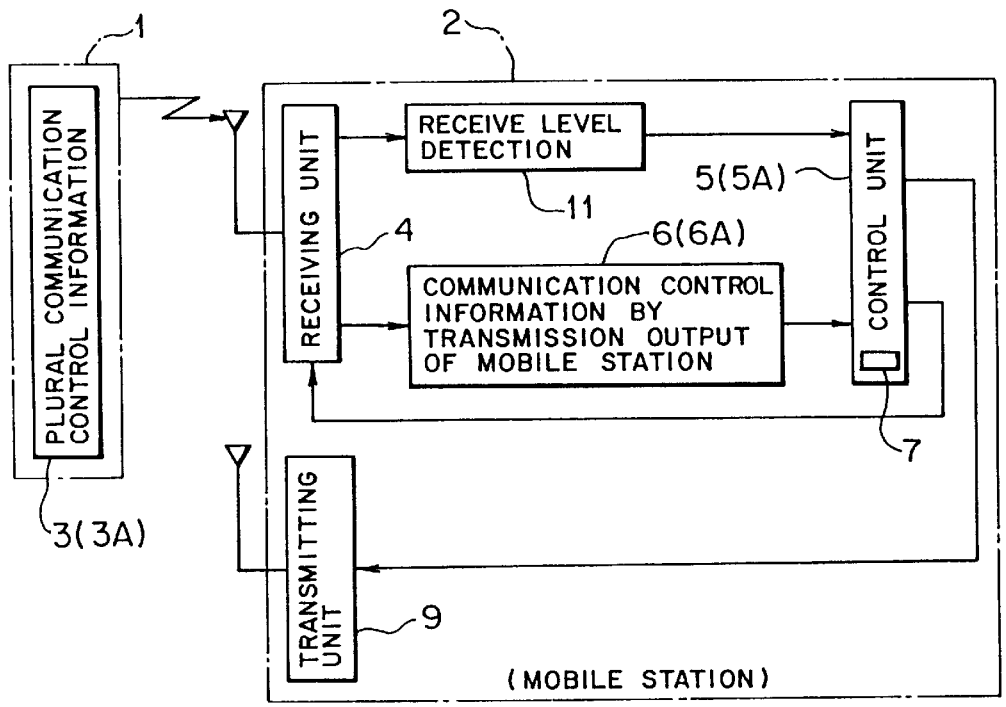
FIG. 5 is a block diagram showing the main configuration of an embodiment according to the present invention.

FIG. 5 is a block diagram showing an embodiment of the present invention. Referring to FIG. 5, numeral 1 represents a base station and 2 represents a mobile station. The mobile communication system includes the base station 1 and the mobile station 2.

Numeral 3(3A) represents a reporting unit. The reporting unit 3(3A) is arranged in the base station 1 to broadcast information considering the transmission output difference to the mobile station 2, to the mobile station 2.

Numeral 4 represents a receiving unit. The receiving unit 4 is arranged in the mobile station 2 to receive broadcast information reported from the reporting unit 3 in the base station 1.

Numeral 5(5A) represents a control unit. The control unit 5(5A) controls with the communication level KL and the communication out level RL (communication control information) to each mobile station 2 according to the broadcast information received by the receiving unit 4, and communication control is performed when a predetermined receiving level about up and down directions of the mobile station 2 and the base station 1 is sufficient.

The reporting unit 3(3A) in the base station 1 is constituted as means that reports plural pieces of information regarding communication level KL and plural pieces of information regarding communication out level level RL, corresponding to the transmission output P2 of the mobile station 2.

Numeral 6(6A) represents a selecting unit. The selecting unit 6(6A) selects the communication level KL and communication out level level RL corresponding to the transmission output P2 of the self station 2 among plural pieces of information regarding communication level KL and communication out level level RL sent from the base station 1, and then outputs them to the control unit 5(5A).

Numeral 7 represents a discriminating unit. The discriminating unit 7 is arranged to the control unit 5(5A) to discriminate whether the self station 2 performs a communication control at the communication level KL and communication out level level RL each selected by the selecting unit 6(6A).

Numeral 11 represents a receiving level detecting unit. The receiving level detecting unit 11 detects a signal level received by the receiving unit 4.

The broadcast information reported from the reporting unit 3 in the base station 1 to the mobile station 2 is constituted as the schematic diagram shown in FIG. 9 or 10.

That is, the broadcast information is formed with value each pieces of data (shown in the figures) arranged at allocated bit locations. Each of pieces of data includes the following content.

(a) Message classification
(b) Network number
(c) Regulation information
(d) Control channel structure information
(e) Mobile station transmission power designation
(f) Communication level classified by transmission output of mobile station
(g) Communication out level level classified by transmission output of mobile station
(h) Position registration area muliplex number
(i) Location number
(j) The number of maximum report channels
(k) Perch channel number for communicable zone/sector decision
(l) Perch channel number
(m) Location registration timer
(n) Extended information factor length
(o) Extended information factor In the broadcast information, with the transmission output P1 of the base station 1 being, for example, 1 W, as (f) the communication level KL classified by the transmission output of a mobile station, as shown in FIG. 9, the following plural values corresponding to the output P2 of the mobile station 2 are included.

With the output P2 of the mobile station 2 being 3 W, the communication level KL is set to 8 dB$\mu$V.

With the output P2 of the mobile station 2 being 2 W, the communication level KL is set to 8 dB$\mu$V.

With the output P2 of the mobile station 2 being 0.8 W, the communication level KL is set to 9 dB$\mu$V.

With the output P2 of the mobile station 2 being 0.3 W, the communication level KL is set to 13.3 dB$\mu$V.

In the broadcast information, as (g) the communication out level level RL classified by the transmission output of a mobile station the following plural values corresponding to the output P2 of the mobile station 2 are included.

With the output P2 of the mobile station 2 being 3 W, the communication out level level RL is set to 2 dB$\mu$V.

With the output P2 of the mobile station 2 being 2 W, the communication out level level RL is set to 2 dB$\mu$V.

With the output P2 of the mobile station 2 being 0.8 W, the communication out level level RL is set to 3 dB$\mu$V.

With the output P2 of the mobile station 2 being 0.3 W, the communication out level level RL is set to 7.3 dB$\mu$V.

Moreover, in the broadcast information, with the transmission output P1 of the base station 1 being, for example, 3 W, as (f) the communication out level level RL classified by the transmission output of a mobile station, as shown in FIG. 10, the following plural values corresponding to the output P2 of the mobile station 2 are included.

With the output P2 of the mobile station 2 being 3 W, the communication level KL is set to 8 dB$\mu$V.

With the output P2 of the mobile station 2 being 2 W, the communication level KL is set to 9.7 dB$\mu$V.

With the output P2 of the mobile station 2 being 0.8 W, the communication level KL is set to 13.7 dB$\mu$V.

With the output P2 of the mobile station 2 being 0.3 W, the communication level KL is set to 18.0 dB$\mu$V.

In the broadcast information, as (g) the communication out level level RL classified by the transmission output of a mobile station the following plural values corresponding to the output P2 of the mobile station 2 are included.

With the output P2 of the mobile station 2 being 3 W, the communication out level level RL is set to 2 dB$\mu$V.

With the output P2 of the mobile station 2 being 2 W, the communication out level level RL is set to 3.7 dB$\mu$V.

With the output P2 of the mobile station 2 being 0.8 W, the communication out level level RL is set to 7.7 dB$\mu$V.

With the output P2 of the mobile station 2 being 0.3 W, the communication out level level RL is set to 12.0 dB$\mu$V.

Figure 8:
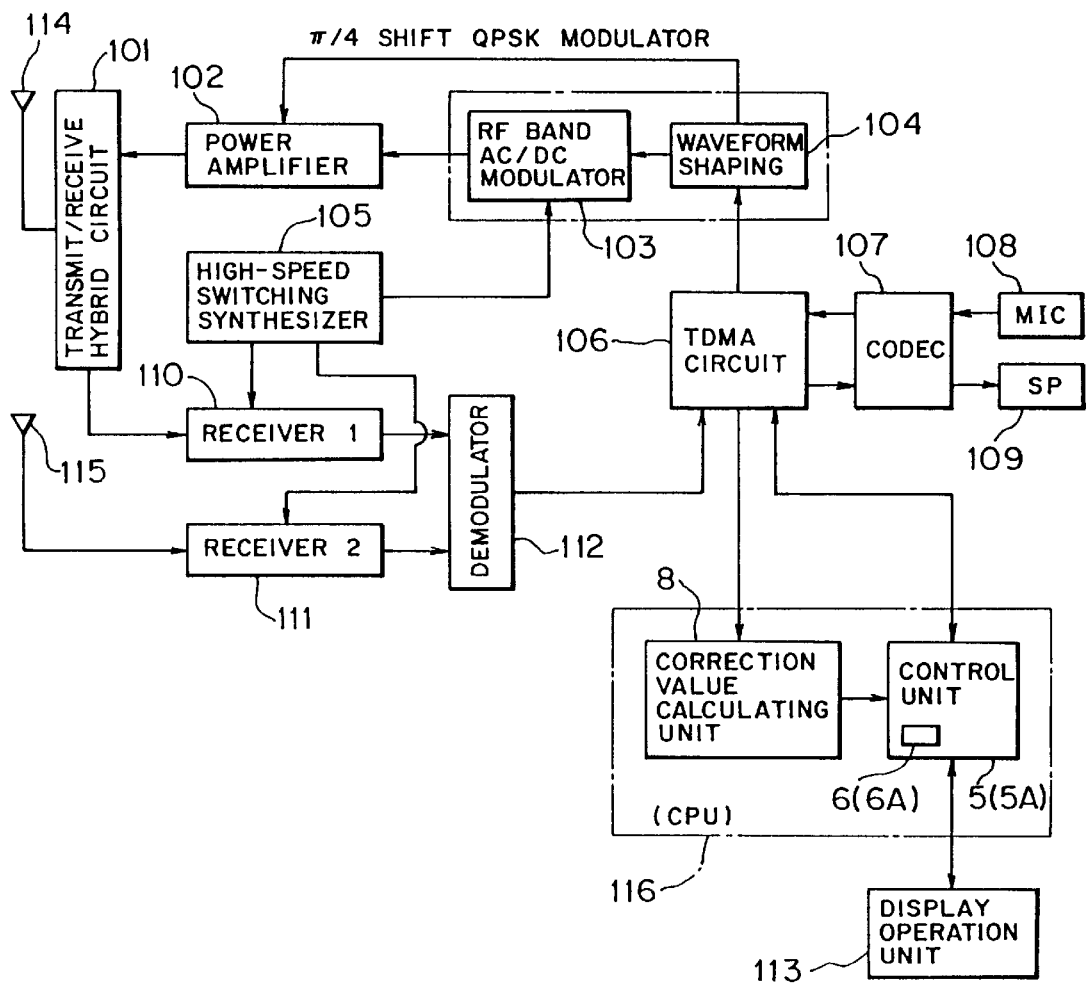
FIG. 8 is a block diagram showing the hardware configuration of the main portion according to an embodiment of the present invention.

The mobile station 2 has the hardware configuration as shown in the block diagram in FIG. 8.

Numerals 114 and 115 represent antennas in FIG. 8. The communication radio wave is transmitted and received through the antenna 114 and the transmit/receive hybrid circuit 101. The antenna 115 receives the radio wave.

Numerals 110 and 111 represent receivers. The radio waves received with the antenna 114 and 115 are input to the receiver 110 and 111, respectively. After the receiving operation such as detection is performed with the local oscillation output from the high-speed switching synthesizer 105, this radio wave is input to the demodulator 112.

The demodulator 112 demodulates a better one of the outputs from the receivers 110 and 111. This operation is performed the so-called diversity reception.

Numeral 106 represents a TDMA (Time division multiple access) circuit. The TDMA circuit 106 receives a demodulation signal from the demodulator 112 and then releases its timesharing state, thus extracting desired data.

Numeral 107 represents a CODEC (coder-decoder). The CODEC 107 receives an output signal from the TDMA circuit 106 to convert it into an analog signal, thus producing a voice signal through a loud speaker 109.

The CODEC 107 is applied to the transmission system. The CODEC 107 converts an output from the microphone 108 into a digital signal, thus producing it to the TDMA circuit 106.

Furthermore, the TDMA circuit 106 as well is constituted so as to be applicable to the transmission system. The TDMA circuit 106 is constituted such that it receives an output from the CODEC 107, performs a desired timesharing process, and then inputs the serial data to the wave shaper 104.

The wave shaper 104 subjects an output from the TDMA circuit 106 to a desired wave shaping process.

Numeral 103 represents a RF band orthogonal modulator. The RF band orthogonal modulator 103 modulates an input from the wave shaper 104 into a signal in a desired RF band using the output of the high-speed switching synthesizer 105 and then outputs the resultant signal.

Numeral 102 represents a power amplifier. The power amplifier 102 receives a signal in a RF band from the RF band orthogonal modulator 103 and high-frequency amplifies a signal to a desired output. Then the resultant signal is transmitted out of the antenna 114 via the transmit/receive hybrid circuit 101.

Numeral 116 represents a CPU (Central processing unit). The CPU 116 has the functions of a control unit 5(5A), a selecting unit 6(6A), and a correction value calculating unit 8. In response to the output from the TDMA circuit 106, the CPU 116 implements various processes described above, thus producing a desired control output.

Numeral 113 is a display operation unit. The display operation unit 113 receives the output from the CPU 116 and displays, for example, "in communication permission state".

Figure 14:
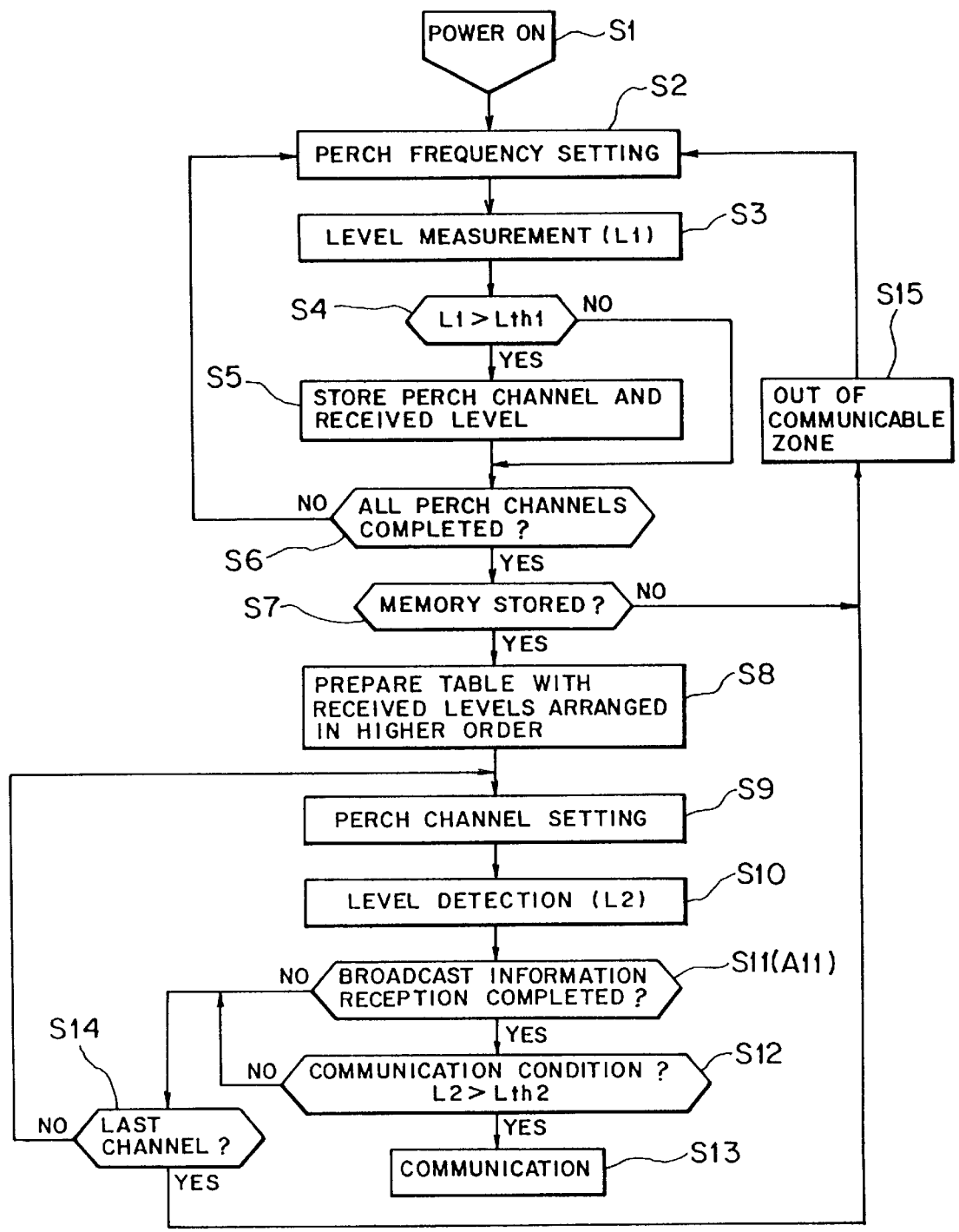
FIG. 14 is a flowchart showing the operation of the main portion according to an embodiment of the present invention.

In the above-mentioned configuration, the mobile station 2 according to the present embodiment operates according to the flowchart shown in FIG. 14.

Power is first turned on (step S1) and then the perch frequency is set (step S2).

The perch frequency is set to a specific one among plural kinds of communication frequency channels in the mobile station 2 as a candidate for communications. Every time the step S2 is implemented, different frequencies are employed as candidates in prescribed order.

The receiving level L1 of the receiver 4 set to at a perch frequency is measured in the step S3 to judge whether the receiving level L1 exceeds the threshold level Lth1 (step S4).

The threshold level Lth1 is set to a level at which normal communications is hardly expected, or to a lower level than the communication level KL or communication out level level RL.

If the receiving level L1 exceeds the threshold level Lth1, the perch channel and the receiving level of the perch channel are written into a memory via the "YES" route (step S5).

Thereafter, it is judged whether all perch channels have been subjected to an examination operation in the steps S2 to S5 (step S6). If there are channels unexamined, examination is performed from the step S2 via the "NO" route. This process is repeated till all the perch channels have been completely examined.

When all the perch channels have been completely examined, it is judged in the step S7 whether the perch channel has been written into the memory in the step S5. In the case of no writing operation, the receiving levels L1 of each of all the channels are less than the threshold level Lth1. Since it is judged via the NO route that the communications is impossible, the process (display) for regions out of a communicable zone is performed (step S15). Hence any communication cannot be performed.

Where it is judged that writing has been completed in the step S7, communicable channels may exist. For the corresponding channels, a table on which the receiving levels are listed in decreasing order is prepared (step S8).

Next, a communication channel is set to the perch channel on the top of the table prepared in the step S8 (step S9).

The receiving level L2 of the channel is detected (step S10) while the broadcast information is received.

The broadcast information includes the content shown in FIG. 21. The operation along the flowchart shown in FIG. 20 will be described in detail later.

Next, it is judged in the step S11 (step A1) whether receiving the broadcast information has been completed. At the completion, the step S12 is performed via the "YES" route.

In the step S12, it is judged whether the receiving level L2 exceeds the communication level Lth2 classified by the mobile station transmission output as the communication level KL. If yes, the corresponding channel is communicable. Hence the discriminating unit 7 discriminates a communication permission (step S13).

On the other hand, where the receiving level L2 does not exceed the communication level Lth2 classified by the transmission output of a mobile station, the step S14 is implemented via the "NO" route.

Figure 20:
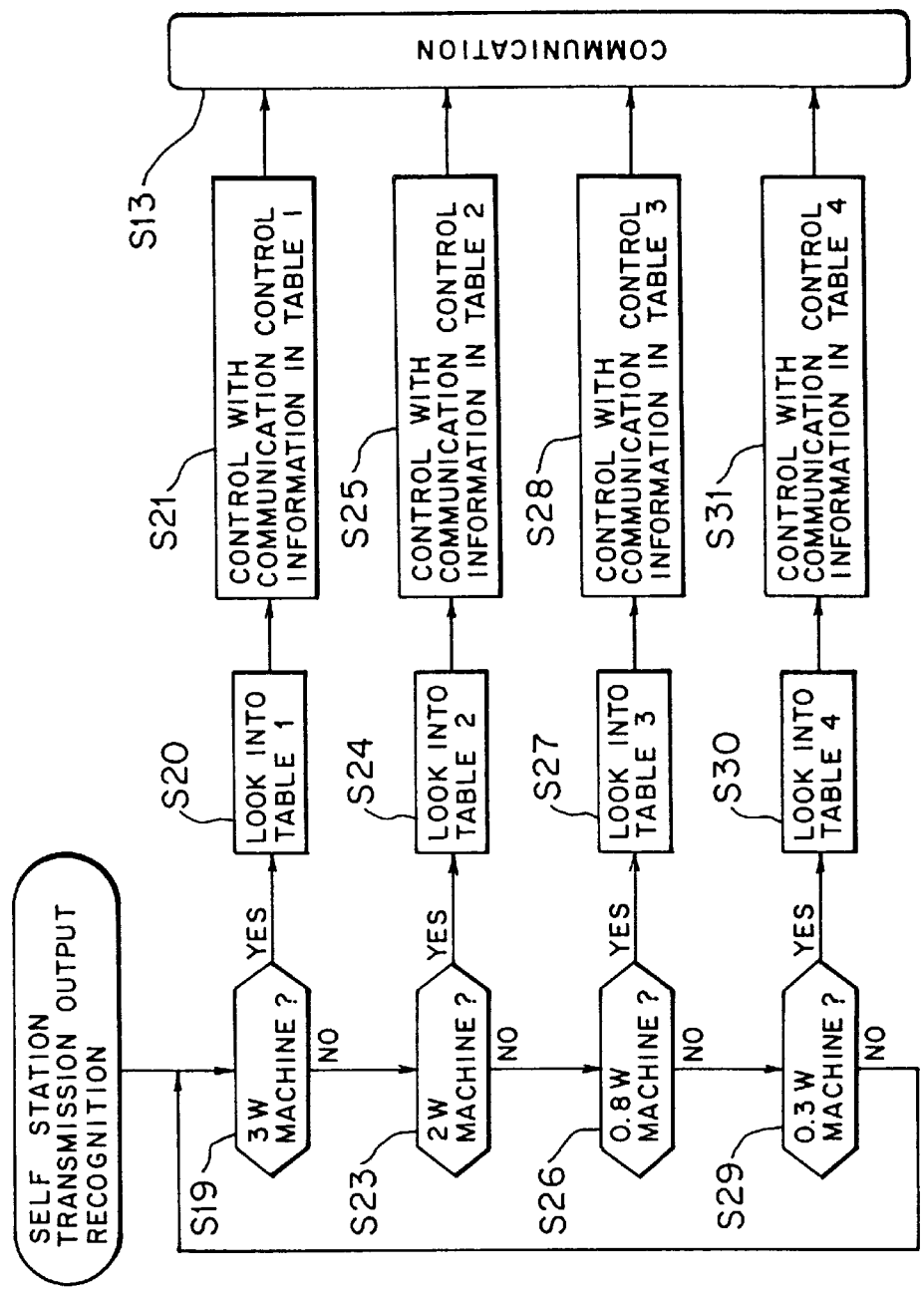
FIG. 20 is a flowchart showing the operation of the main portion of the CPU according to an embodiment of the present invention.

Plural communication levels Lth2 classified by the transmission output of a mobile station are set as shown in FIG. 20. The level corresponding to the transmission output P2 is adopted.

It is judged whether the channel in examination is the last channel in the step S14. If the corresponding channel is not the last channel in the prepared table in the step S8, the next candidate channel is subjected to the process from the step S9 via the "NO" route.

Where the last channel has been completely examined, channels having possible communicable states do not exist. Hence the process (display) for regions out of a communicable zone is performed via the "YES" route in the step S15 and the communication cannot be performed.

Figure 17:
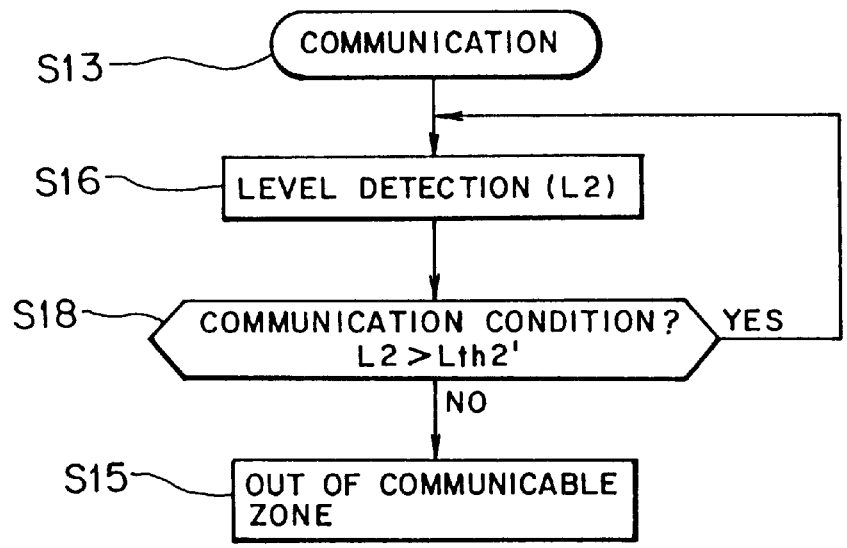
FIG. 17 is a flowchart showing the operation of another main portion according to an embodiment of the present invention.

The communication permission (step S13) is performed by implementing each of the steps in the flowchart regarding the communication permission. After the communication state, various operations are implemented according to the flowchart shown in FIG. 17.

That is, the receiving level L2 of the mobile station 2 is detected every predetermined time (step S16).

Every time the receiving level is detected, it is judged whether the receiving level L2 exceeds the communication out level level Lth2' classified by the transmission output of a mobile station as a communication out level level RL (step S18). Where the excessive state continues, the waiting condition is satisfied. Hence the process from the step S16 via the "YES" route, or so-called communication condition monitoring, is continuously repeated.

In the step S18, where it is judged that the receiving level L2 does not exceed the communication out level level Lth2' classified by the transmission output of the mobile station, the process (display) for regions out of a communicable zone is performed (step S15) because of no communication condition obtained. Hence the communications cannot be established.

In such a manner, the corresponding operation is performed to a change in status after the establishment of the communication condition so that the communication condition establishing status can be ensured at a communication time.

When the CPU 116 selects control information corresponding to the self-station transmission output P2, the selecting unit 6(6A) implements the operation according to the flowchart shown in FIG. 20.

That is, after recognition of the self-station transmission output P2, a judgment operation is performed in the step S19.

If the 3 W output mobile station 2 is recognized, the table "1" is referred through the "YES" route in the step S20.

The communication state (step S13) comes by performing a control with communication control information in the table "1" (step S21).

If the 2 W output mobile station 2 is recognized, the step S23 is executed via the "NO" route from the step S19 and then the table "2" is referred through the "YES" route in the step S24.

The control operation is performed according to the communication control information in the table "2" (step S25) and then the mobile station 2 reaches to a communication state (step S13).

If the 0.8 W output mobile station 2 is recognized, the step S26 is executed via the "NO" route in the step S23. Then the table "3" is referred through the "YES" route in the step S27.

The control operation is performed according to the communication control information in the table "3" (step S28), and then the mobile station 2 reaches to a communication state (step S13).

If the 0.3 W output mobile station 2 is recognized, the step S29 is executed via the "NO" route in the step S26. Then the table "4" is referred through the "YES" route in the step S30.

The control operation is performed according to the communication control information in the table "4" (step S31), and then the mobile station 2 reaches to a communication state (step S13).

The tables "1" to "4" store readably the communication level Lth2 and the communication out level level Lth2' each corresponding to the output P2 of each mobile station 2 shown in FIG. 21.

As described above, the control is performed using each of the level values Lth2 and Lth2'. The communication permission release judging control is performed using each degradation level.

Such control operations enable each prescribed transmit/receive quality shown in FIGS. 22 and 23.

Figure 24:
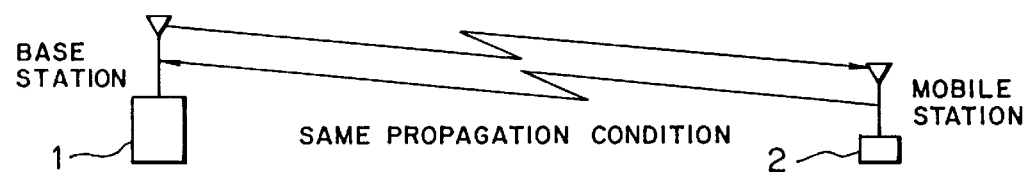
FIG. 24 is a schematic diagram showing an example of the operational state.

Let us consider 1 W output base station 1, comparing with the general example shown in FIG. 24.

The communication level KL (Lth2) and the communication out level level RL (Lth2') have the values shown in FIG. 9, respectively.

Referring to FIG. 22, when the transmission output (1a) of the base station 1 is 143 dB$\mu$V, the receiving level of the 3 W mobile station 2 is 8 dB$\mu$V, under the propagation loss of 135 dB.

The communication level Lth2, as shown in FIG. 9, is 8 dB$\mu$V. The permission discrimination allows the transmission output (2') from the mobile station 2.

If the transmission output (2') is 147.7 dB$\mu$V, the receiving level of the base station 1 is 12.7 dB$\mu$V, thus satisfying the predetermined quality.

When the transmission output (1b) of the base station 1 is 143 dB$\mu$V, the receiving level of the 2 W mobile station 2 is 8 dB$\mu$V, under the propagation loss of 135 dB.

The communication level Lth2, as shown in FIG. 9, is 8 dB$\mu$V. According to the permission discrimination, the mobile station 2 produces the transmission output (3').

If the transmission output (3') is 146.0 dB$\mu$V, the receiving level of the base station 1 is 11 dB$\mu$V, thus satisfying the predetermined quality.

Moreover, when the transmission output (1c) of the base station 1 is 143 dB$\mu$V, the receiving level of the 0.8 W mobile station 2 is 9 dB$\mu$V, under the propagation loss of 134 dB.

The communication level Lth2, as shown in FIG. 9, is 9 dB$\mu$V. The permission discrimination allows the transmission output (4') of the mobile station 2.

When the transmission output (4') is 142.0 dB$\mu$V, the receiving level of the base station 1 is 8 dB$\mu$V, thus satisfying the predetermined quality.

When the transmission output (1d) of the base station 1 is 143 dB$\mu$V, the receiving level of the 0.3 W mobile station 2 is 13.3 dB$\mu$V, under the propagation loss of 129.7 dB.

The communication level Lth2, as shown in FIG. 9, is 13.3 dB$\mu$V. The permission discrimination allows the transmission output (5') of the mobile station 2.

When the transmission output (5') is 137.7 dB$\mu$V, the receiving level of the base station 1 is 8 dB$\mu$V, thus satisfying the predetermined quality.

As described above, the communication level KL corresponding to each output classification of the mobile station 2 can be set, thus providing a predetermined communication quality.

Figure 25:
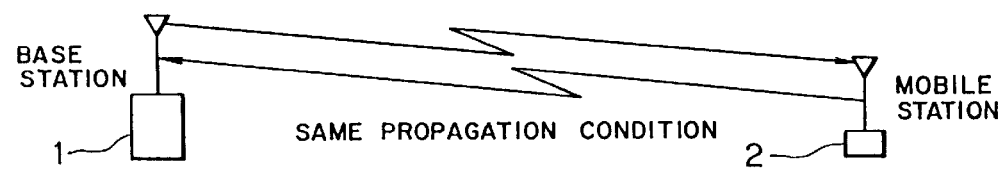
FIG. 25 is a schematic diagram showing an example of another operational state.

Next, let us consider the base station 1 with 3 W output, compared with the general example shown in FIG. 25. The operation is shown in FIG. 23.

The communication level KL (Lth2) and the communication out level level RL (Lth2') have the values listed in FIG. 10, respectively.

When the transmission output (6a) of the base station 1 is 147.7 dB$\mu$V, the receiving level of the 3 W mobile station 2 is 8 dB$\mu$V, under the propagation loss of 139.7 dB.

The communication level Lth2, as shown in FIG. 10, is 8 dB$\mu$V. The permission discrimination allows the transmission output (7') of the mobile station 2.

When the transmission output (7') is 147.7 dB$\mu$V, the receiving level of the base station 1 is 8 dB$\mu$V, thus satisfying the predetermined quality.

When the transmission output (6b) of the base station 1 is 147.7 dB$\mu$V, the receiving level of the 2 W mobile station 2 is 9.7 dB$\mu$V, under the propagation loss of 138 dB.

The communication level Lth2, as shown in FIG. 10, is 9.7 dB$\mu$V. The permission discrimination allows the transmission output (8') of the mobile station 2.

When the transmission output (8') is 146.0 dB$\mu$V, the receiving level of the base station 1 is 8 dB$\mu$V, thus satisfying the predetermined quality.

Moreover, when the transmission output (6c) of the base station 1 is 147.7 dB$\mu$V, the receiving level of the 0.8 W mobile station 2 is 13.7 dB$\mu$V, under the propagation loss of 134 dB.

The communication level Lth2, as shown in FIG. 10, is 13.7 dB$\mu$V. The permission discrimination allows the transmission output (10') of the mobile station 2.

When the transmission output (10') is 142.0 dB$\mu$V, the receiving level of the base station 1 is 8 dB$\mu$V, thus satisfying the predetermined quality.

When the transmission output (6d) of the base station 1 is 147.7 dB$\mu$V, the receiving level of the 0.3 W mobile station 2 is 18 dB$\mu$V, under the propagation loss of 129.7 dB.

The communication level Lth2, as shown in FIG. 10, is 18 dB$\mu$V. The permission discrimination allows the transmission output (9') of the mobile station 2.

When the transmission output (9') is 137.7 dB$\mu$V, the receiving level of the base station 1 is 8 dB$\mu$V, thus satisfying the predetermined quality.

The communication level KL (Lth2) corresponding to each output classification of the mobile station 2 is set. A desired communication quality can be obtained.

The further following effects and advantages can be listed below.

(1) Excellent line quality and communication quality can be obtained in the up and down directions without depending on the difference in transmission output between the base station 1 and the mobile station 2. This feature contributes to greatly-improved services in mobile communication systems such as digital automobile telephones.

(2) Even when the base station 1 is changed due to a channel switching and zone shifting, the broadcast information from the base station 1 is quickly received after the switching operation. A communication control can be performed using a correction value that corrects plural communication levels/communication out level levels or uniform communication levels in response to the transmission output after a switching operation. In communication to any one of base stations 1, good quality can be obtained in the up and down directions.

(3) The communication level corresponding to the transmission output of the self station can be easily selected among plural pieces of communication level information sent from the base station 1. The communication out level level corresponding to the transmission output of the self station can be easily selected among plural pieces of communication out level level information sent from the base station 1.

Figure 6:
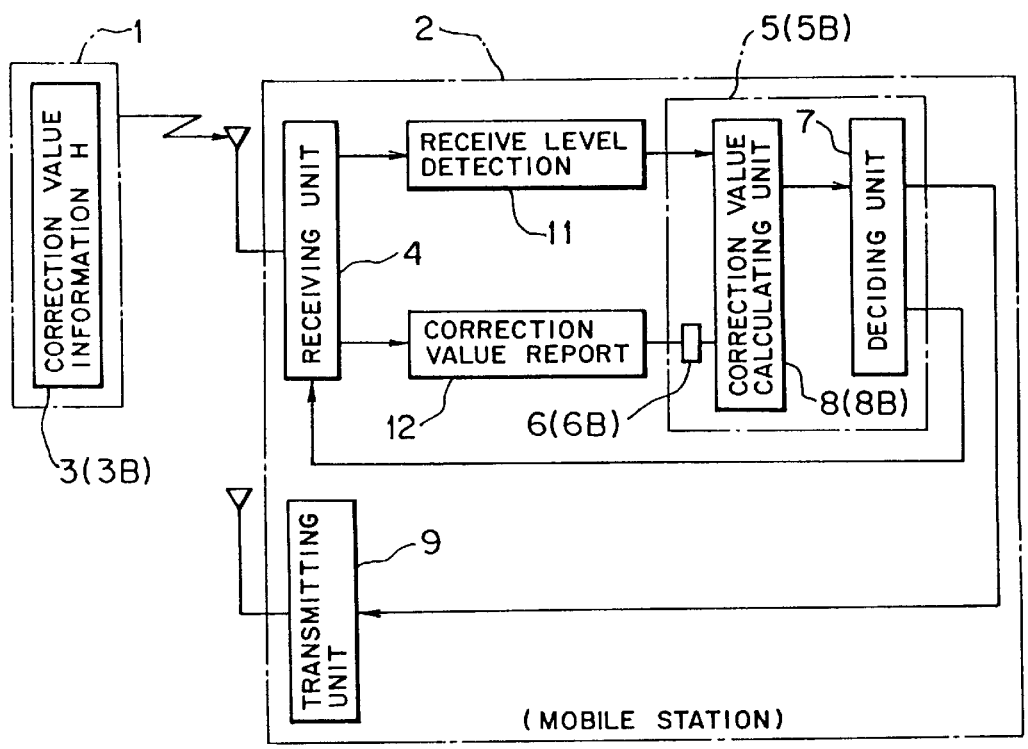
FIG. 6 is a block diagram showing a modified main configuration according to an embodiment of the present invention.

The present embodiment shown in FIG. 5 is constituted like the modified example shown in FIG. 6.

In the base station 1, the reporting unit 3(3B) is constituted as means that reports information regarding a pair of communication levels KL, information regarding a communication out level level RL (fixed communication control information), and plural pieces of correction value information H used to correct information regarding the communication levels KL and the communication out level level RL, in response to the transmission output P2 of the mobile station 2. In the mobile station 2, the control unit 5(5B) includes the selection unit 6(6B) that selects a correction value HT corresponding to the transmission output P2 of the self station 2 among the communication level KL, the communication out level level RL, and plural pieces of correction value information H, each sent from the base station 1, the correction value calculating unit 8(8B) that corrects the communication level KL and the communication out level level RL using the correction value HT selected by the selecting unit 6(6B), and the discriminating unit 7 that discriminates whether the self station 2 is in a communication permission or inhibition state with a corrected value.

Hence, plural pieces of correction value information H in the reporting unit 3 is transmitted to the correction value reporting unit 12 via the receiving unit 4. The correction value calculating unit 8(8B) calculates based on the plural pieces of correction value information H. The discriminating unit 7 discriminates whether the self station 2 is in a communication permission or inhibition state, using the resultant correction value.

Figure 11:
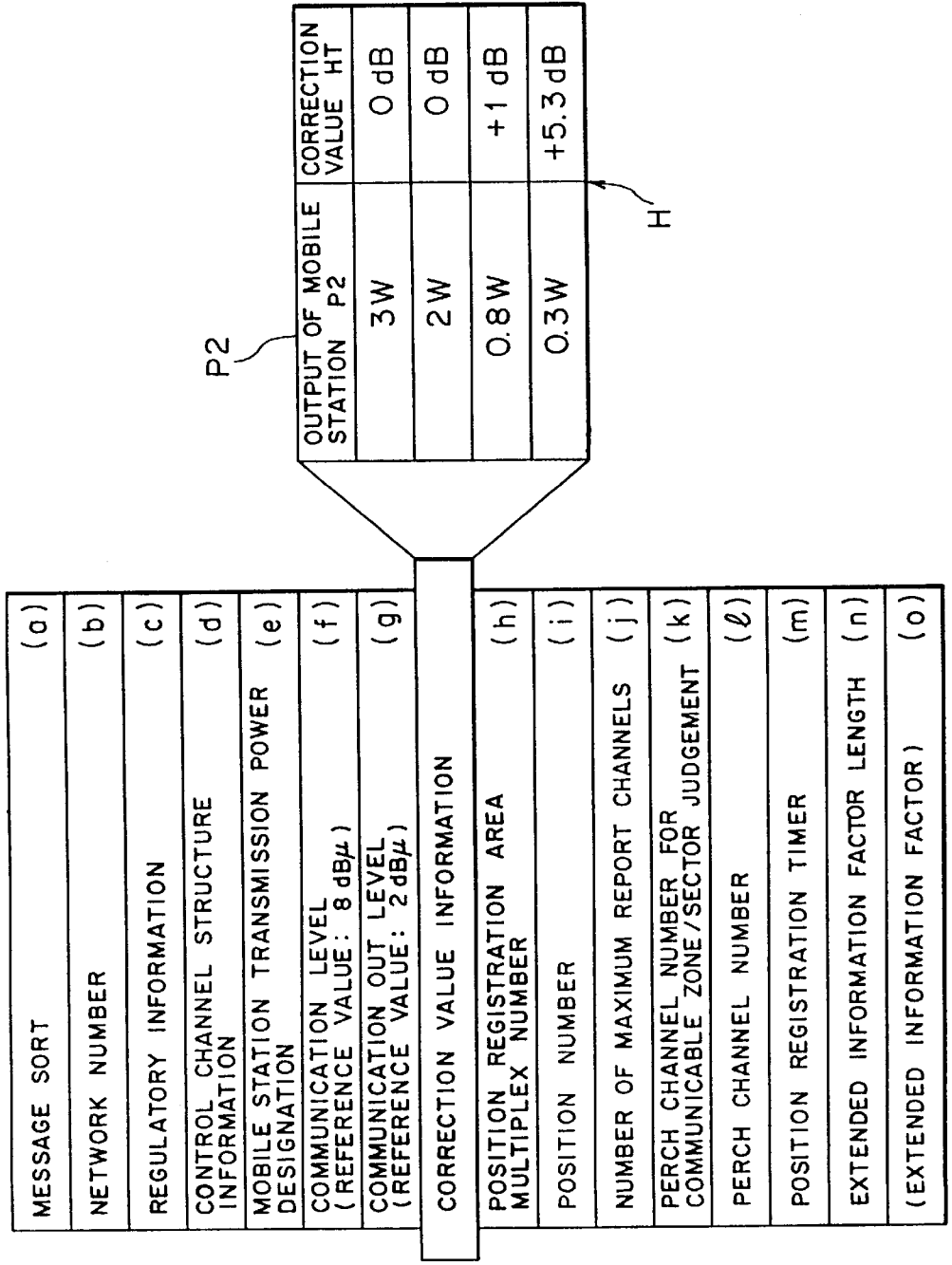
FIG. 11 is a schematic diagram showing an example of the broadcast information configuration according to an embodiment of the present invention.
Figure 12:
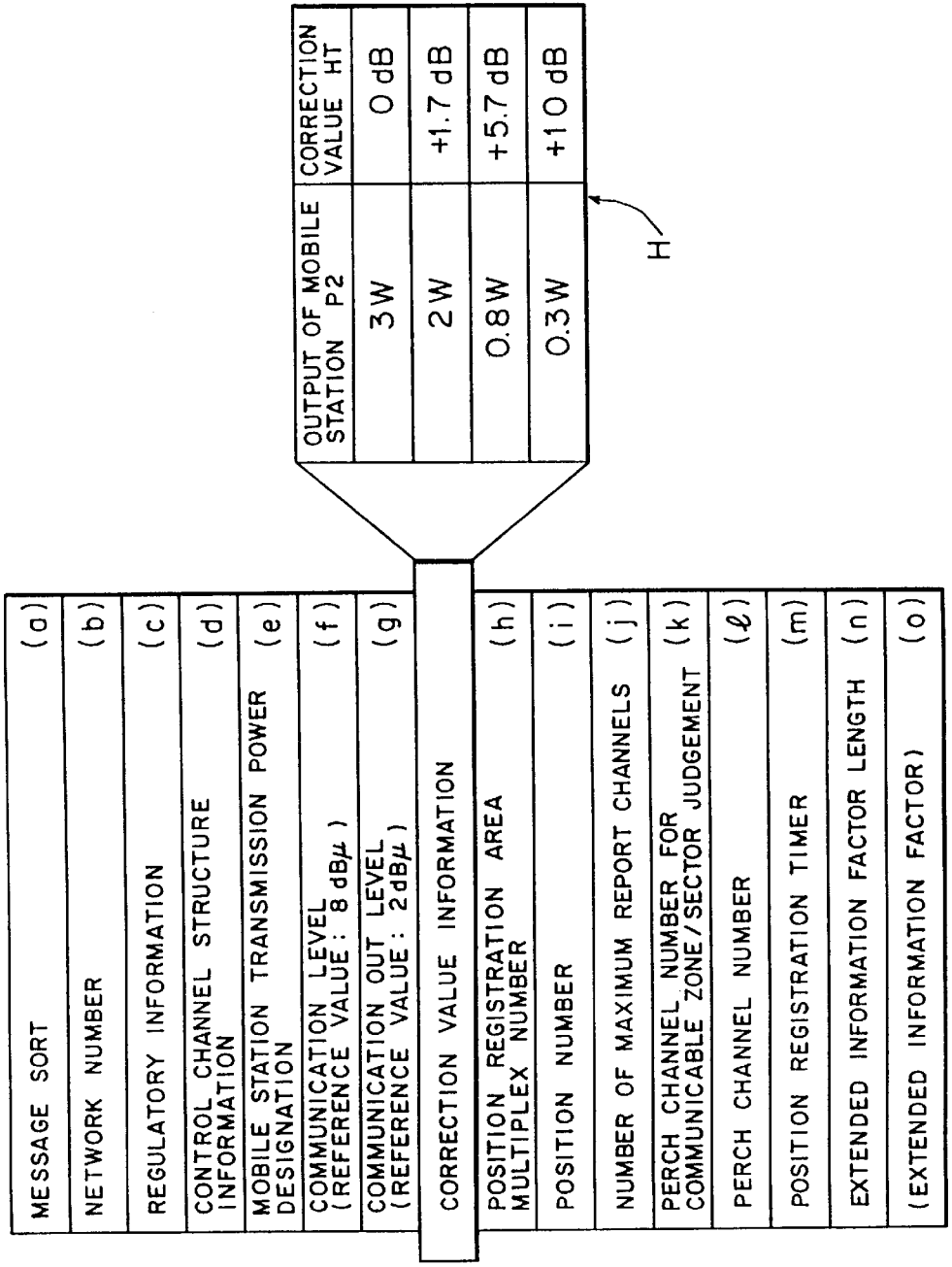
FIG. 12 is a schematic diagram showing an example of the broadcast information configuration according to an embodiment of the present invention.

The correction value information H is formed, for example, as shown in FIGS. 11 and 12. The case where transmission output P1 of the base station 1 is 1 W will be described with reference to FIG. 11. When the transmission output P2 of the mobile station 2 is 3 W, the correction value HT is set to 0 dB.

When the transmission output P2 of the mobile station 2 is 2 W, the correction value HT is set to 0 dB. When the transmission output P2 of the mobile station 2 is 0.8 W, the correction value HT is set to +1 dB. When the transmission output P2 of the mobile station 2 is 0.3 W, the correction value HT is set to 5.3 dB.

The case where the transmission output P1 of the base station 1 is 3 W is described by referring to FIG. 11. When the transmission output P2 of the mobile station 2 is 3 W, the correction value HT is set to 0 dB.

When the transmission output P2 of the mobile station 2 is 2 W, the correction value HT is set to 1.7 dB. When the transmission output P2 of the mobile station 2 is 0.8 W, the correction value HT is set to +5.7 dB. When the transmission output P2 of the mobile station 2 is 0.3 W, the correction value HT is set to 10 dB.

Figure 15:
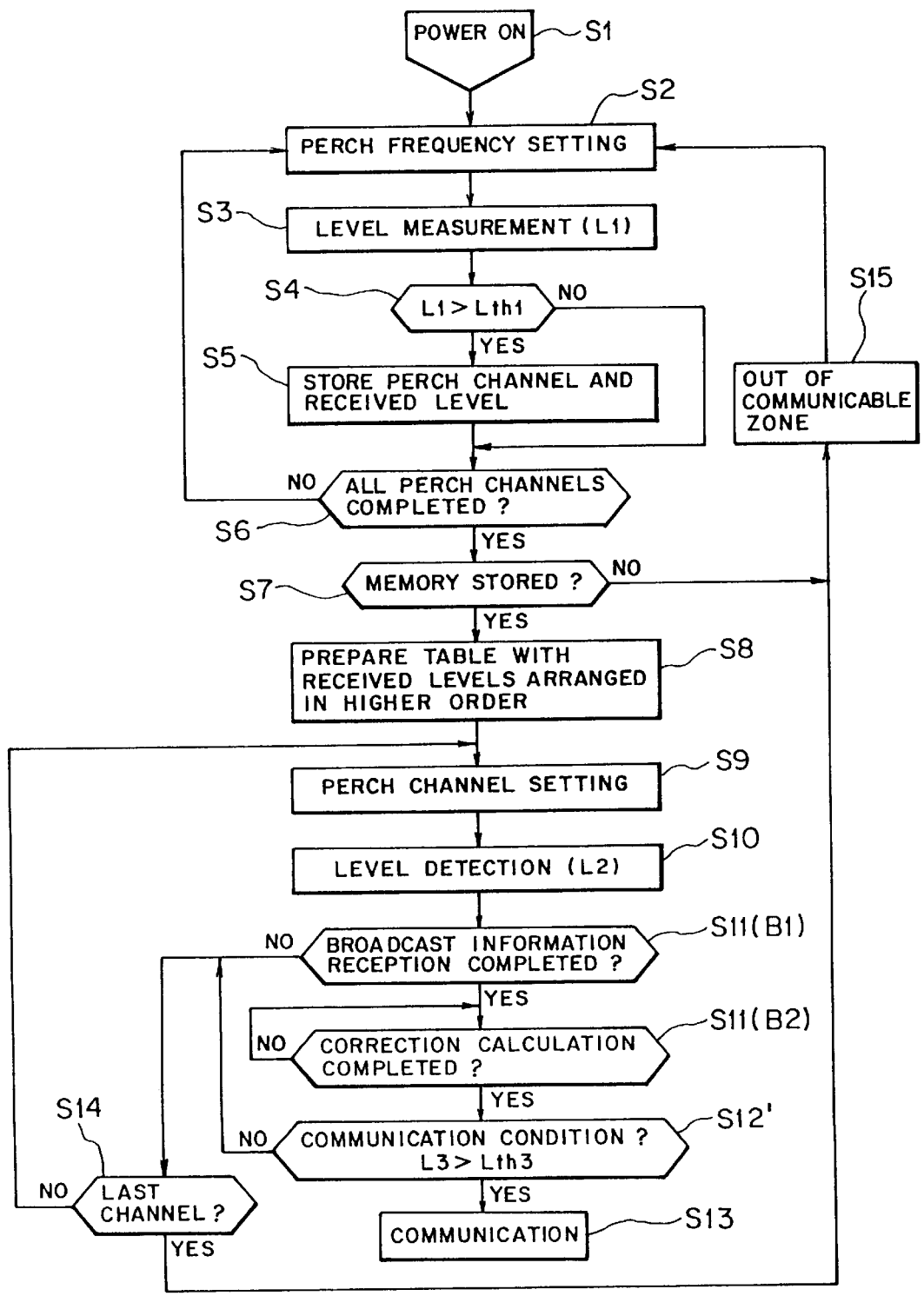
FIG. 15 is a flowchart showing the operation of the main portion of according to a modified embodiment of the present invention.

The present modified example with such a configuration performs the operation according to the flowchart shown in FIG. 15. The operations in the steps S1 to S10 are similar to the above-mentioned operations. Hence the duplicate explanation will be omitted here.

When broadcast information has been received in the step S11(B11), the correction value calculating unit 8(8B) performs an arithmetic operation. Then the correction value HT shown in FIGS. 11 and 12 is added to the receiving level L2 detected in the step S10. The calculated result becomes the corrected receiving level L3 (step S11(B1)).

It is judged whether the corrected receiving level L3 exceeds the predetermined value Lth3 as a communication level KL (step S12). If yes, a communication permission operation is performed (step S13).

In such a manner, the condition of the communication permission in which the receiving level L2 is corrected corresponding to the transmission output P2 of the mobile station 2 is judged.

Figure 18:
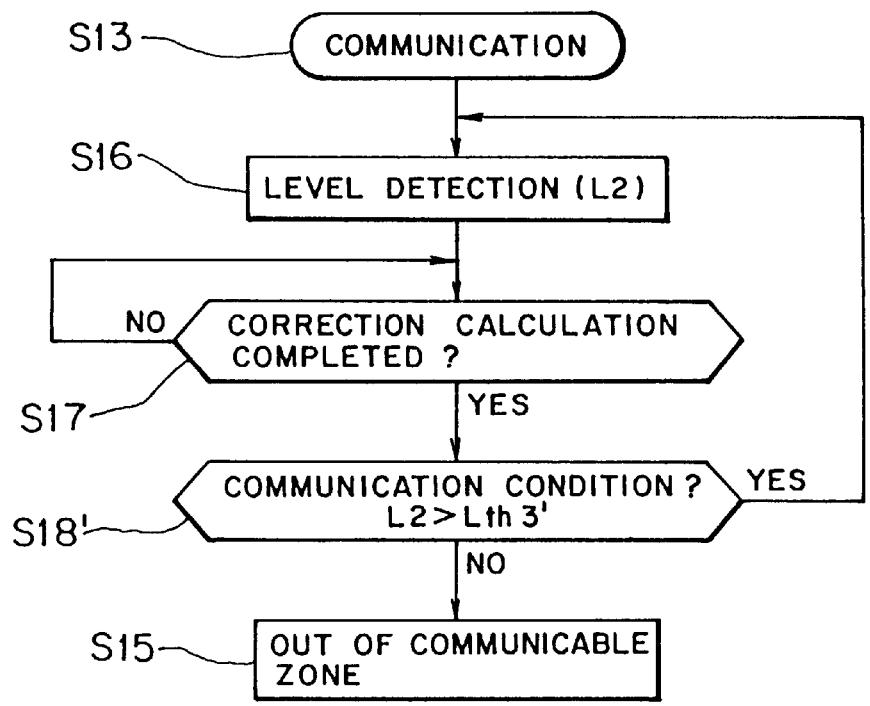
FIG. 18 is a flowchart showing the operation of another main portion of a modified example according to an embodiment of the present invention.

After the communication permission, as shown in FIG. 18, the judgment is repeated using the correction calculation (step S17) and the predetermined value Lth3' as a communication out level level RL.

In other words, it is confirmed every predetermined calculation period in the step S18' that the corrected receiving level L3 is maintained more than the predetermined communication out level level Lth3'. When the condition is satisfied, the communication state is maintained. If the condition is not satisfied, the process (display) for regions out of a communicable zone is performed via the "NO" route in the step S18' (step S15).

The resultant effects and advantages are listed as follows:

(1) Good line quality and communication quality are obtained in the up and down directions without depending on the difference in transmission output between the base station 1 and the mobile station 2. Hence this feature contributes to greatly-improved services in mobile communication systems such as digital automobile telephones.

(2) Even when the base station 1 is changed due to a channel switching and zone shifting, broadcast information is quickly received from the switched base station 1. A communication control can be performed with a correction value used to correct plural communication levels/communication out level levels, or uniform communication levels, according to the transmission output after the switching operation. Hence good quality can be obtained in the up and down directions even at communications to any one of the base stations 1.

(3) The communication level corresponding to the transmission output of the self station can be easily selected among plural pieces of communication level information sent from the base station 1. The communication out level level corresponding to the transmission output of the self station can be easily selected among plural pieces of communication out level level information sent from the base station 1.

(4) The correction value corresponding to the transmission output of the self station is selected among plural pieces of correction value information sent from the base station 1. The communication level and communication out level level can be easily corrected using the selected correction value.

Figure 7:
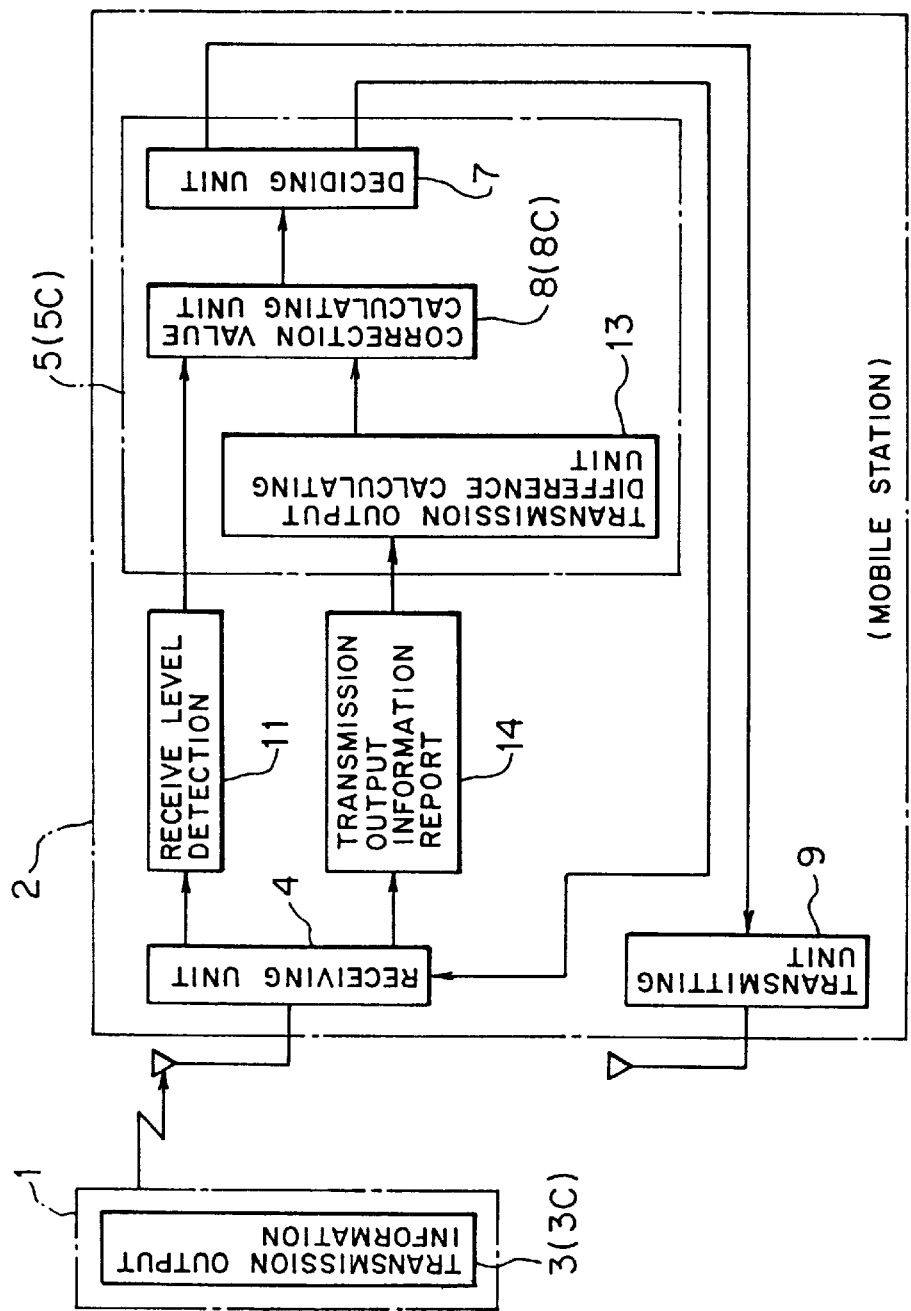
FIG. 7 is a block diagram showing a modified main configuration according to an embodiment of the present invention.

The present embodiment shown in FIG. 5 can be constituted like the modified example shown in FIG. 7.

In the modified example, the reporting unit 3(3C) in the base station 1 is constituted as means that reports information regarding the transmission output P1 of the base station 1 itself, in addition to a pair of information regarding the communication level KL and information regarding communication out level level RL. In the mobile station 2, the control unit 5(5C) includes the transmission output difference calculating unit 13 that calculates the difference ΔP between the transmission output P1 of the base station 1 and the transmission output P2 of the mobile station 2 itself according to information regarding the transmission output P1 sent from the base station 1, the correcting unit 8(8C) that corrects the communication level KL and the communication out level level RL using the difference value ΔP as a correction value HT calculated by the transmission output difference calculating unit 13, and the discriminating means 7 that discriminates whether the self station is in a communication permission or inhibition state according to the value corrected by the correcting unit 8(8C).

The transmission output difference calculating unit 13 receives the output from the transmission output information reporting unit 14 that reports the transmission output information in response to signals received by the receiving unit 4. When the receiving level of the self station 2 is more than a desired communication level KL and the receiving level corrected with the difference ΔP in transmission output between the base station 1 and the self station 2 is more than the communication level KL, the control unit 5(5C) in the mobile station 2 permits waiting. Where the receiving level corrected with the difference ΔP in transmission output between the base station 1 and the self station 2 is less than a desired communication out level level RL, the control unit 5(5C) in the mobile station 2 inhibits waiting.

Figure 13:
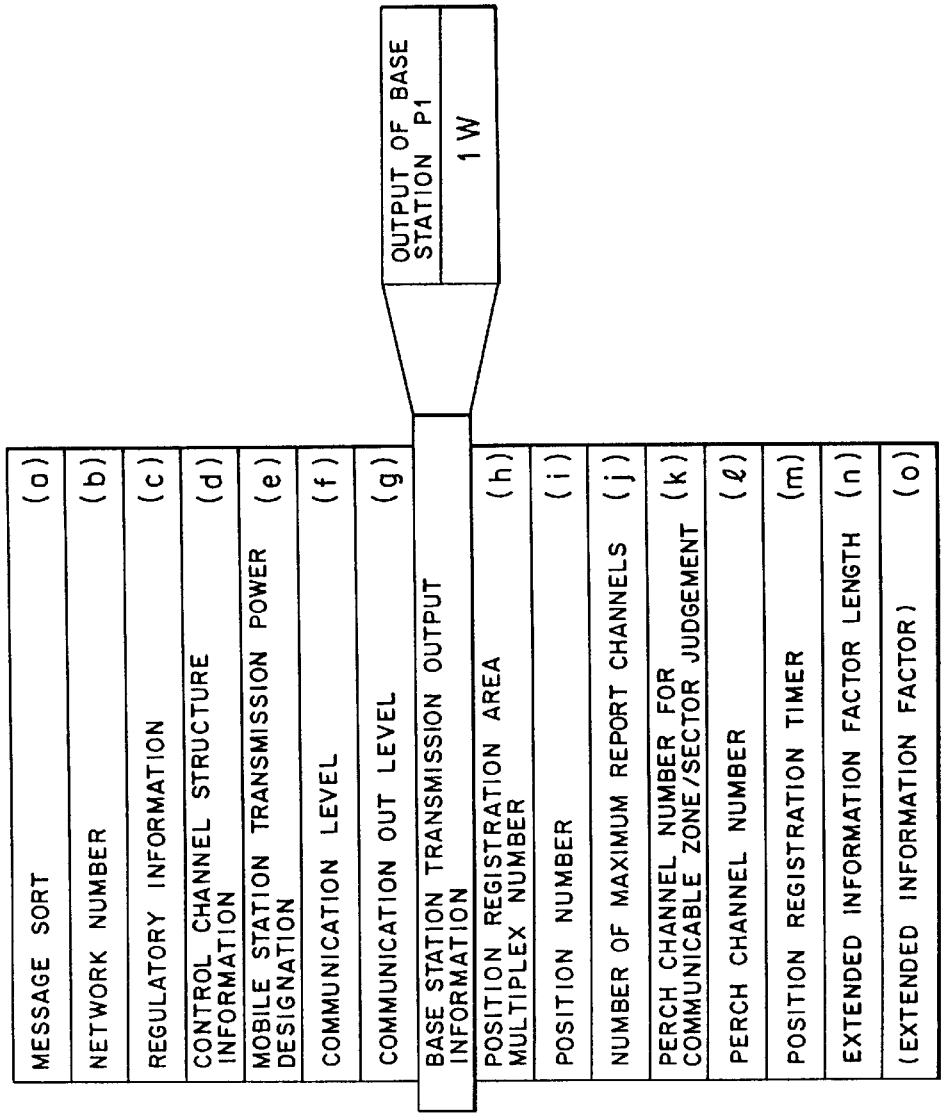
FIG. 13 is a schematic diagram showing an example of the broadcast information configuration according to an embodiment of the present invention.

The broadcast information shown in FIG. 13 is formed to broadcast information regarding the transmission output P1 of the base station 1 itself. For example, the value, "1" W, or the transmission output P1 of the base station 1, exists in the data bit of the base station transmission output information.

Figure 16:
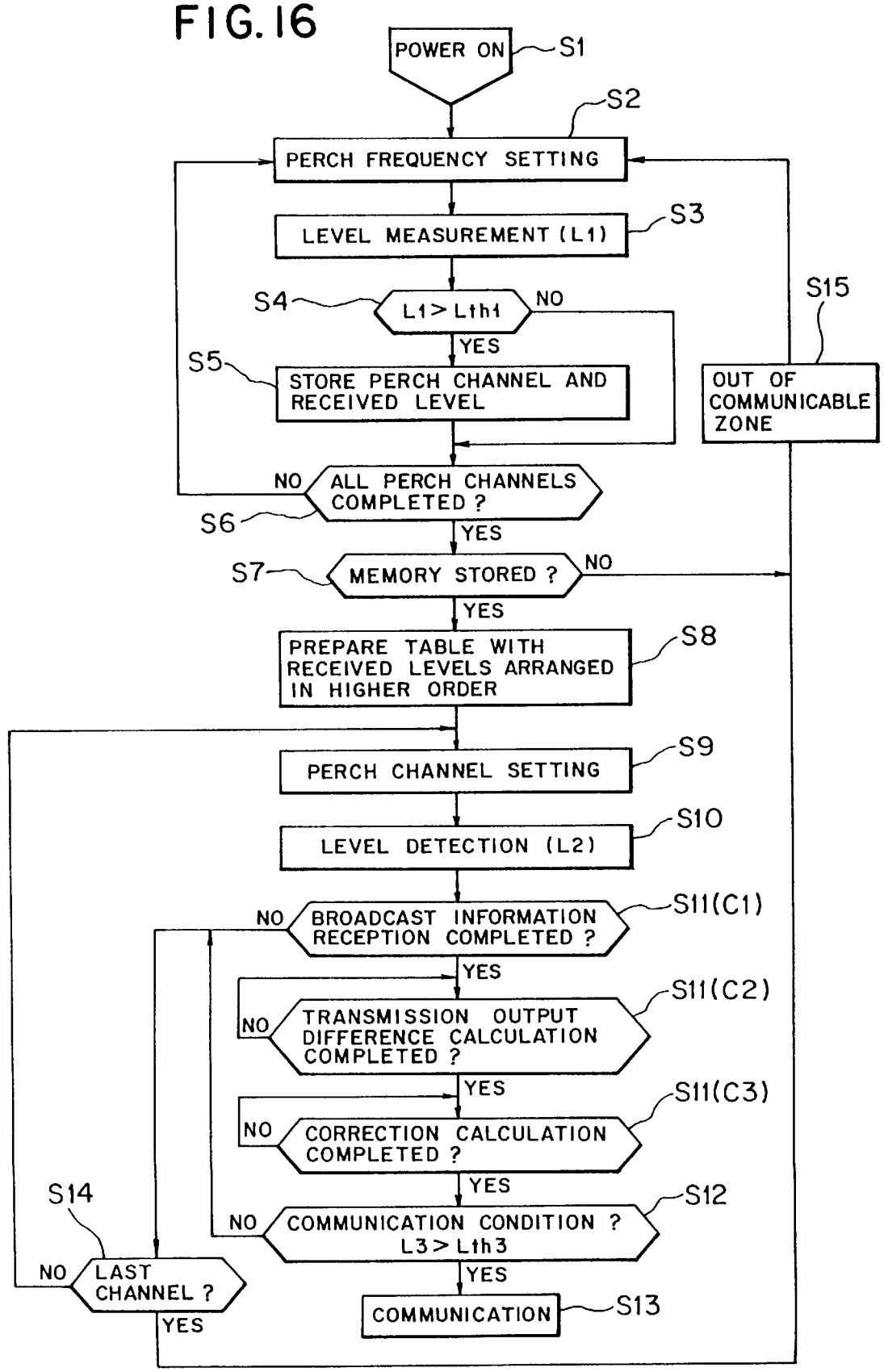
FIG. 16 is a flowchart showing the operation of the main portion of another modified example according to an embodiment of the present invention.

The modified example with the above-mentioned configuration operates according to the flowchart shown in FIG. 16. The operations in the steps S1 to S10 are similar to the above mentioned operations. The duplicate explanation will be omitted here.

When broadcast information has been received in the step S11(C1), the correction value calculating unit 8(8C) performs an arithmetic operation in the steps S11(C2, C3).

The difference ΔP between the transmission output P1 of the base station 1 and the transmission output P2 of the mobile station 2 is calculated in the step S11(C2). Then the correction value HT is calculated corresponding to the difference ΔP.

The correction value HT is subtracted from the receiving level L2 in the step S11(C3). Then the calculated result becomes the corrected receiving level L3 (=L2−HT).

It is judged whether the corrected receiving level L3 exceeds the predetermined value (communication level) Lth3 (step S12'). If yes, a communication permission operation is performed (step S13).

Thus, the communication permission condition is judged in the receiving level L2 corrected corresponding to the transmission output P2 of the mobile station 2.

Figure 19:
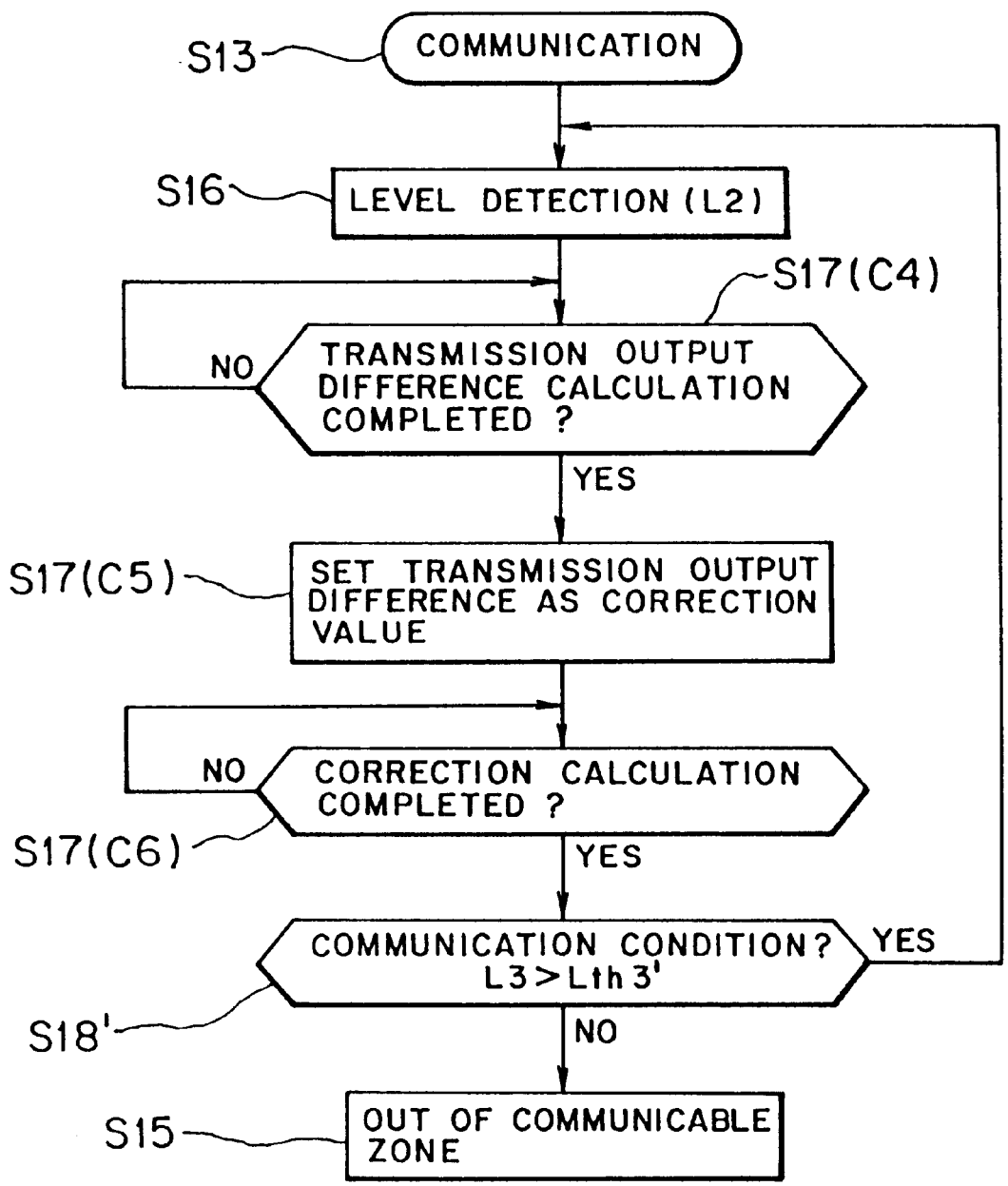
FIG. 19 is a flowchart showing the operation of another main portion of another modified example according to an embodiment of the present invention.

After the communication permission, as shown in FIG. 19, the transmission output difference calculation [step S17 (C4)], the correction value calculation [step S17(C5)], the correction calculation [step S17(C6)], and judgement by the communication out level level Lth3' (step S18') are repeated.

Namely, it is confirmed every predetermined calculation period whether the corrected receiving level L3 exceeds a predetermined communication out level level Lth3' in the step S18'. If the condition is met, the communication permission state is maintained. If not, the process (display) for regions out of a communicable zone is performed via the "NO" route from the step S18' (step S15).

The resultant effects and advantages are listed as follows:

(1) Good line quality and communication line can be provided in the up and down directions without depending on the difference in transmission output between the base station 1 and the mobile station 2. This feature contributes to greatly-improved services in mobile communication systems such as digital automobile telephones.

(2) Even when the base station 1 is changed due to channel switching and zone shifting, broadcast information from the base station 1 is quickly received after the switching operation. Thus, a communication control is made with a correction value used to correct plural communication level/communication out level level or uniform communication levels each corresponding to the transmission output after the switching operation. Hence, good line quality is obtained in the up and down directions at communications to any base station 1.

(3) A communication level corresponding to the transmission output of the self station can be easily selected according to plural pieces of communication level information sent from the base station 1. A communication out level level corresponding to the transmission output of the self station can be easily selected according to plural pieces of communication out level level information sent from the base station 1.

(4) A judgement of a communication permission corresponding to the transmission output of a self station can be surely performed by calculating the difference between the transmission output of the base station 1 and the transmission output of the mobile station 2 itself and then correcting the communication level and the communication out level level, using the resultant value as a correction value.

(5) Where the receiving level of a self station is more than a desired communication level and the receiving level corrected with the difference in transmission output between the base station and the self station is more than the communication level, waiting is permitted. Where the receiving level corrected with the difference in transmission output between the base station and the self station is less than the communication out level level, waiting is inhibited. Hence the communication permission can be surely judged.

What is claimed is:

1. A mobile communication system comprising:

a base station including broadcasting means for reporting broadcasting information; and a mobile station including receiving means for receiving said broadcasting information and control means for performing communication control based on said broadcasting information received by said receiving means of said mobile station, said broadcasting information including a plurality of different kinds of communication control information, which correspond one to each of a plurality of predetermined transmission outputs containing a given transmission output of said mobile station, said different kinds of communication control information being predetermined, based on a transmission output difference between said mobile station and said base station, with respect to at least a receiving level at which waiting at said mobile station is permitted so that the receiving level of said mobile station allows communications to said base station;

said control means including selecting means for selecting one of said plurality of different kinds of communication control information corresponding to the transmission output of said mobile station, and discriminating means for discriminating whether or not said communication control is performed based on a result of the selection by said selecting means.

2. A mobile communication system comprising:

a base station including broadcasting means for reporting broadcasting information; and a mobile station including receiving means for receiving said broadcasting information and control means for performing communication control based on said broadcasting information received by said receiving means of said mobile station, said broadcasting information including fixed communication control information and a plurality of different kinds of correction value information, said fixed communication control information being with respect to at least a receiving level at which waiting at said mobile station is permitted so that the receiving level of said mobile station allows communication to said base station, said plurality of different kinds of correction value information corresponding one to each of a plurality of predetermined transmission outputs containing a given transmission output of said mobile station, said plurality of different kinds of correction value information being predetermined based on a transmission output difference between said mobile station and said base station;

said control means including selecting means for selecting one of said plurality of different kinds of correction value information corresponding to the transmission output of said mobile station, correcting means for correcting said fixed communication control information with the selected correction value information, and discriminating means for discriminating whether or not said communication control is performed based on a result of the correction by said correcting means.

3. A mobile communication system comprising:

a base station including broadcasting means for reporting broadcasting information; and a mobile station including receiving means for receiving said broadcasting information and control means for controlling based on said broadcasting information, said broadcasting information including fixed communication control information and a transmission output of said base station, said fixed communication control information being with respect to at least a receiving level at which waiting at said mobile station is permitted so that the receiving level of said mobile station allows communications to said base station;

said control means including correcting means for calculating a transmission output difference between said mobile station and said base station and correcting said fixed communication control information with the calculated transmission output difference, and discriminating means for discriminating whether or not said communication control is performed based on a result of the correction by said correcting means.

4. The mobile communication system according to claim 3, wherein said control means in said mobile station establishes a communication permission on the condition that the receiving level of the mobile station is more than a desired communication level and a receiving level corrected with the transmission output difference between said base station and said mobile station is more than said communication level.

5. The mobile communication system according to claim 3, wherein said control means in said mobile station establishes a communication out level on the condition that the receiving level corrected with the transmission output difference between said base station and said self station is less than a desired communication out level.

6. A mobile station used as a part of a mobile communication system which comprises a mobile station and a base station, said mobile station including:

receiving means for receiving broadcasting information reported from the base station; and control means for controlling based on said broadcasting information said broadcasting information including fixed communication control information and plurality of different kinds of correction value information, said fixed communication control information being with respect to at least a receiving level at which waiting at said mobile station is permitted so that the receiving level of said mobile station allows communications to said base station, said correction value information corresponding one to each of a plurality of predetermined transmission outputs containing a given transmission output of said mobile station, said plurality of different kinds of correction value information being predetermined based on a transmission output difference between said mobile station and the base station;

said control means including selecting means for selecting one of said plurality of different kinds of correction value information corresponding to the transmission output of said mobile station, correcting means for correcting said fixed communication control information with the selected correction value information, and discriminating whether or not a communication control is performed based on a result of the correction by said correcting means.

7. A communication control method in a mobile communication system including a base station and a mobile station, said communication control method comprising the step of:

at the base station (a) reporting broadcasting information, said broadcasting information including a plurality of different kinds of communication control information, which correspond one to each of a plurality of predetermined transmission outputs containing a given transmission output of the mobile station, said plurality of different kinds of communication control information being predetermined, based on a transmission output difference between the mobile station and the base station, with respect to at least a receiving level at which waiting at the mobile station is permitted so that the receiving level of the mobile station allows communications to the base station;

at the mobile station (b) receiving broadcasting information reported from said base station;

(c) selecting one of said plurality of different kinds of communication control information corresponding to the transmission output of the mobile; and (d) discriminating whether or not said communication control is performed based on a result of said selecting.

8. A communication control method in a mobile communication system including a base station and a mobile station, said communication control method comprising the steps of:

at the base station
- (a) reporting broadcasting information in reporting means, said broadcasting information including fixed communication control information and a plurality of different kinds of correction value information, said fixed communication control information being with respect to at least a receiving level at which waiting at the mobile station is permitted so that the receiving level of the mobile station allows communications to the base station, said plurality of different kinds of correction value information corresponding one to each of a plurality of predetermined transmission outputs containing a given transmission output of the mobile station, said plurality of different kinds of correction value information being predetermined based on a transmission output difference between the mobile station and the base station;

at the mobile station
- (b) receiving broadcasting information reported from the base station;
- (c) selecting one of said plurality of different kinds of correction value information corresponding to the transmission output of said mobile station;
- (d) correcting said fixed communication control information with the selected correction value information; and
- (e) discriminating whether or not said communication control is performed based on a result of said correcting.

9. A communication control method in a mobile communication system including a base station and a mobile station, said communication control method comprising the steps of:

at the base station
- (a) reporting broadcasting information, said broadcasting information including fixed communication control information and a transmission output of the base station, said fixed communication control information being with respect to at least a receiving level at which waiting at the mobile station is permitted so that the receiving level of the mobile station allows communications to the base station;

at the mobile station
- (b) receiving broadcasting information reported by the base station;
- (c) calculating a transmission output difference between the mobile station and the base station;
- (d) correcting said fixed communication control information with the calculated transmission output difference; and
- (e) discriminating whether or not said communication control is performed based on a result of said correcting.

10. The communication control method in a mobile communication system according to claim 9, further comprising the step of:
establishing a communication permission in said mobile station on the condition that the receiving level of said mobile station is more than a desired communication level and a receiving level corrected with the transmission output difference between said base station and said mobile station is more than said communication level.

11. The communication control method in a mobile communication system according to claim 9, further comprising the step of:
establishing a communication out level in said mobile station on the condition that the receiving level corrected with the transmission output difference between said base station and said mobile station is less than a desired communication out level.

12. A base station adapted to be used as a part of a mobile communication system which includes a mobile station and a base station, said base station being equipped with broadcasting means for reporting broadcasting information,
said broadcasting information including a plurality of different kinds of communication control information, which correspond one to each of a plurality of predetermined transmission output containing a given transmission output of the mobile station, said plurality of different kinds of communication control information being predetermined, based on a transmission output difference between the mobile station and said base station, with respect to at least a receiving level at which waiting at the mobile station is permitted so that the receiving level of the mobile station allows communications to said base station, whereby the mobile station selects one of said plurality of communication control information corresponding to said transmission output of the mobile station and discriminates whether or not said communication is performed based on a result of the selection.

13. A base station used as a part of a mobile communication system which comprises a mobile station and a base station, said base station being equipped with broadcasting means for reporting broadcasting information,
said broadcasting information including fixed communication control information and a plurality of different kinds of correction value information, said fixed communication control information being with respect to at least a receiving level at which waiting at the mobile station is permitted so that the receiving level of the mobile station allows communications to said base station, said plurality of different kinds of correction value information corresponding one to each of a plurality of predetermined transmission outputs containing a given transmission output of the mobile station, said plurality of different kinds of correction value information being predetermined based on a transmission output difference between the mobile station and said base station, whereby the mobile station selects one of said plurality of correction value information, corrects said fixed communication control information with the selected correction value information and discriminates whether or not communication control is performed based on a result of the correction.

14. A base station used as a part of a mobile communication system which comprises a mobile station and a base station, said base station including broadcasting means for reporting broadcasting information,
said communication control information including fixed communication control information and a transmission output by said base station, said fixed communication control information being with respect to at least a receiving level at which waiting at the mobile station is permitted so that the receiving level of the mobile station allows communications to said base station, whereby the mobile station calculates a transmission output difference between the mobile station and said base station, corrects said fixed communication control information with the calculated transmission output difference and discriminates whether or not communication control is performed based on a result of the correction.

15. A mobile station used as a part of a mobile communication system which comprises a mobile station and a base station, said mobile station including:

receiving means for receiving broadcasting information reported from the base station;

control means for controlling based on said broadcasting information, said broadcasting information including a plurality of different kinds of communication control information, which correspond one to each of a plurality of predetermined transmission outputs containing a given transmission output of said mobile station, said plurality of different kinds of communication control information being predetermined, based on a transmission output difference between said mobile station and said base station, with respect to at least a receiving level at which waiting at said mobile station is permitted so that the receiving level of the mobile station allows communications to the base station;

said control means including
selecting means for selecting one of said plurality of different kinds of communication control information corresponding to the transmission output of said mobile station, and
discriminating means for discriminating whether or not said communication control is performed based on a result of the selection by the selecting means.

16. A mobile station in a mobile communication system, said mobile communication system comprising a mobile station and a base station, said mobile station including:

receiving means for receiving broadcasting information reported from the base station; and control means for controlling based on said broadcasting information, said broadcasting information including fixed communication control information and a transmission output of the base station, said fixed communication control information being with respect to at least a receiving level at which waiting at said mobile station is permitted so that the receiving level of said mobile station allows communications to the base station;

said control means including
correcting means for calculating a transmission output difference between the base station and said mobile station and for correcting said fixed communication control information with the calculated transmission output difference, and
discriminating whether or not said communication control is performed based on a result of the correction by said correcting means.

17. The mobile station in a mobile communication system according to claim 16, wherein said control means establishes a communication permission in said mobile station on the condition that the receiving level of said mobile station is more than a desired communication level and a receiving level corrected with the transmission output difference between said base station and said mobile station is more than the communication level.

18. The mobile station in a mobile communication system according to claim 16, wherein said control means establishes a communication out level in said mobile station on the condition that the receiving level corrected with the transmission output difference between said base station and said mobile station is less than a desired communication out level.

* * * * *